US012532117B2

(12) United States Patent
Zhou et al.

(10) Patent No.: US 12,532,117 B2
(45) Date of Patent: Jan. 20, 2026

(54) VIBRATION COMPONENTS AND SPEAKERS

(71) Applicant: SHENZHEN SHOKZ CO., LTD., Guangdong (CN)

(72) Inventors: Wenbing Zhou, Shenzhen (CN); Lei Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 154 days.

(21) Appl. No.: 18/450,385

(22) Filed: Aug. 15, 2023

(65) Prior Publication Data

US 2023/0396927 A1 Dec. 7, 2023

Related U.S. Application Data

(63) Continuation of application No. PCT/CN2021/133736, filed on Nov. 26, 2021.

(51) Int. Cl.
*H04R 7/06* (2006.01)
*H04R 7/18* (2006.01)

(52) U.S. Cl.
CPC ................. *H04R 7/06* (2013.01); *H04R 7/18* (2013.01); *H04R 2201/003* (2013.01)

(58) Field of Classification Search
CPC ..... H04R 7/06; H04R 7/189; H04R 2201/003
See application file for complete search history.

(56) References Cited

U.S. PATENT DOCUMENTS

| | | | |
|---|---|---|---|
| 2017/0034630 A1 | 2/2017 | Guo et al. | |
| 2020/0045466 A1 | 2/2020 | Song et al. | |
| 2021/0136497 A1 | 5/2021 | Cheng et al. | |
| 2023/0396927 A1 | 12/2023 | Zhou et al. | |

FOREIGN PATENT DOCUMENTS

| | | | |
|---|---|---|---|
| CN | 2314539 Y | | 4/1999 |
| CN | 204810535 U | | 11/2015 |
| CN | 205249470 U | | 5/2016 |
| CN | 106954148 A | | 7/2017 |
| CN | 207053758 U | | 2/2018 |
| CN | 208434106 U | * | 1/2019 |
| CN | 110996226 A | | 4/2020 |
| CN | 111641900 A | | 9/2020 |
| CN | 111935609 A | | 11/2020 |
| CN | 111970617 A | | 11/2020 |
| CN | 212910003 U | | 4/2021 |

(Continued)

OTHER PUBLICATIONS

International Search Report in PCT/CN2021/133736 mailed on Jul. 8, 2022, 7 pages.

(Continued)

*Primary Examiner* — Sunita Joshi
(74) *Attorney, Agent, or Firm* — METIS IP LLC

(57) ABSTRACT

One or more embodiments of the present disclosure relate to a vibration component, including: a mass element and an elastic element. The elastic element may include an enhanced region and a first preprocessing region. The enhanced region may be configured to support the mass element, and the first preprocessing region may provide a first displacement along a vibration direction of the mass element for the mass element.

18 Claims, 27 Drawing Sheets

(56) References Cited

FOREIGN PATENT DOCUMENTS

| | | | | |
|---|---|---|---|---|
| CN | 113542993 A | * 10/2021 | ............ | H04M 1/035 |
| JP | 2005268948 A | * 9/2005 | | |
| JP | 2006311174 | 11/2006 | | |
| WO | 2016165319 A1 | 10/2016 | | |
| WO | 2021089990 A1 | 5/2021 | | |

OTHER PUBLICATIONS

Written Opinion in PCT/CN2021/133736 mailed on Jul. 8, 2022, 6 pages.

Yan, Bingyao, The Measurement for Compliance of Spider and Surround of Speakers, Audio Engineering, (05): 29-32+36, 2006.

The Second Office Action in Chinese Application No. 202111424798.9 mailed on Sep. 4, 2025, 20 pages.

* cited by examiner

Before deformation

After deformation

VIBRATION COMPONENTS AND SPEAKERS

CROSS-REFERENCE TO RELATED APPLICATION

This application is a continuation of International Application No. PCT/CN2021/133736, filed on Nov. 26, 2021, the entire contents of which are hereby incorporated herein by reference.

TECHNICAL FIELD

The present disclosure relates to a field of acoustic technology, in particular to vibration components and speakers.

BACKGROUND

A speaker generates a sound by vibrating air through a vibrating diaphragm. For micro-electromechanical system (MEMS) speaker or a micro-speaker with a small size, as a size of the speaker is on a millimeter level, a size of the vibrating diaphragm is greatly reduced, and a volume of the air pushed is small, making a low sensitivity in a low frequency of the MEMS speaker or the micro-speaker with a small size.

Therefore, it is necessary to propose a vibration component to improve a low frequency performance of the speaker (especially the speaker with a small size).

SUMMARY

One aspect of the present disclosure provides a vibration component. The vibration component may include an elastic element. The elastic element may include an enhanced region, a first preprocessing region, and a fixed region. the enhanced region may be disposed in the middle of the elastic element, the first preprocessing region may be disposed around a periphery of the enhanced region, and the fixed region may be disposed around a periphery of the first preprocessing region. The vibration component may further include a supporting element connected with the fixed region. When the elastic element vibrates, the first preprocessing region provides the enhanced region with a first displacement along a vibration direction of the enhanced region.

In some embodiments, the elastic element further includes a second preprocessing region disposed between the first preprocessing region and the fixed region, the second preprocessing region provides the enhanced region with a second displacement along the vibration direction of the enhanced region.

In some embodiments, the second preprocessing region may be directly connected with or spaced apart from the first preprocessing region.

In some embodiments, the first preprocessing region includes a first bending ring with a first bending direction; and the second preprocessing region includes a second bending ring with a second bending direction.

In some embodiments, a shape of a cross-section of the first bending ring and/or the second bending ring parallel to the vibration direction of the enhanced region includes one or more of an arc shape, an elliptical arc shape, a broken line shape, a pointed tooth shape, or a square tooth shape.

In some embodiments, the first bending direction may be the same as or different from the second bending direction.

In some embodiments, the first bending direction may be opposite to the second bending direction.

In some embodiments, the first bending direction may be perpendicular to the second bending direction.

In some embodiments, a projected area of the second bending ring on a plane perpendicular to the vibration direction of the enhanced region may be smaller than a projected area of the first bending ring on the plane perpendicular to the vibration direction of the enhanced region.

In some embodiments, the supporting element provides the enhanced region with a third displacement along the vibration direction of the enhanced region.

In some embodiments, an elongation at break of the supporting element along the vibration direction of the enhanced region may be in a range of 10%-600%.

In some embodiments, the supporting element may have a hardness of smaller than 80 Shore A.

In some embodiments, a tensile strength of the supporting element may be in a range of 0.5 MPa-100 MPa.

In some embodiments, cross-sections of the supporting element perpendicular to the vibration direction of the enhanced region have different cross-sectional areas along the vibration direction of the enhanced region.

Another aspect of the present disclosure provides a speaker. the speaker may include a housing forming a cavity and an acoustic driver located within the cavity, the acoustic driver including a vibration component and a driving unit. The vibration component includes an elastic element and a supporting element for supporting the elastic element, the supporting element being connected with the housing. The elastic element includes an enhanced region, a first preprocessing region, and a fixed region, the enhanced region being disposed in the middle of the elastic element, the first preprocessing region being disposed around a periphery of the enhanced region, and the fixed region being disposed around a periphery of the first preprocessing region, and the fixed region being connected with the supporting element. When the elastic element vibrates, the first preprocessing region provides the enhanced region with a first displacement along a vibration direction of the enhanced region.

In some embodiments, the elastic element further includes a second preprocessing region disposed between the first preprocessing region and the fixed region, the second preprocessing region provides the enhanced region with a second displacement along the vibration direction of the enhanced region.

In some embodiments, the first preprocessing region includes a first bending ring with a first bending direction; the second preprocessing region includes a second bending ring with a second bending direction; and the first bending direction being the same as or different from the second bending direction.

In some embodiments, the first displacement provided by the first bending ring for the enhanced region may be in a range of 1 um-50 um.

In some embodiments, the second displacement provided by the second bending ring for the enhanced region may be in a range of 1 um-50 um.

In some embodiments, a height of a projected shape of the first bending ring on a projection plane parallel to the vibration direction of the enhanced region may be in a range of 50 um-250 um.

In some embodiments, a length of a projected shape of the first bending ring on a projection plane parallel to the vibration direction of the enhanced region may be in a range of 400 um-800 um.

In some embodiments, a height of a projected shape of the second bending ring on a projection plane parallel to the vibration direction of the enhanced region may be in a range of 50 um-250 um.

In some embodiments, a length of the projected shape of the second bending ring on a projection plane parallel to the vibration direction of the enhanced region may be in a range of 400 um-800 um.

In some embodiments, a projected area of the second bending ring on a plane perpendicular to the vibration direction of the enhanced region may be smaller than the projected area of the first bending ring on the plane perpendicular to the vibration direction of the enhanced region.

In some embodiments, the supporting element provides the enhanced region with a third displacement along the vibration direction of the enhanced region.

In some embodiments, the third displacement may be in a range of 1 um-50 um.

In some embodiments, the cross-sections of the supporting element perpendicular to the vibration direction of the enhanced region have different cross-sectional areas along the vibration direction of the enhanced region.

In some embodiments, the third displacement may be in a range of 1 um-100 um.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
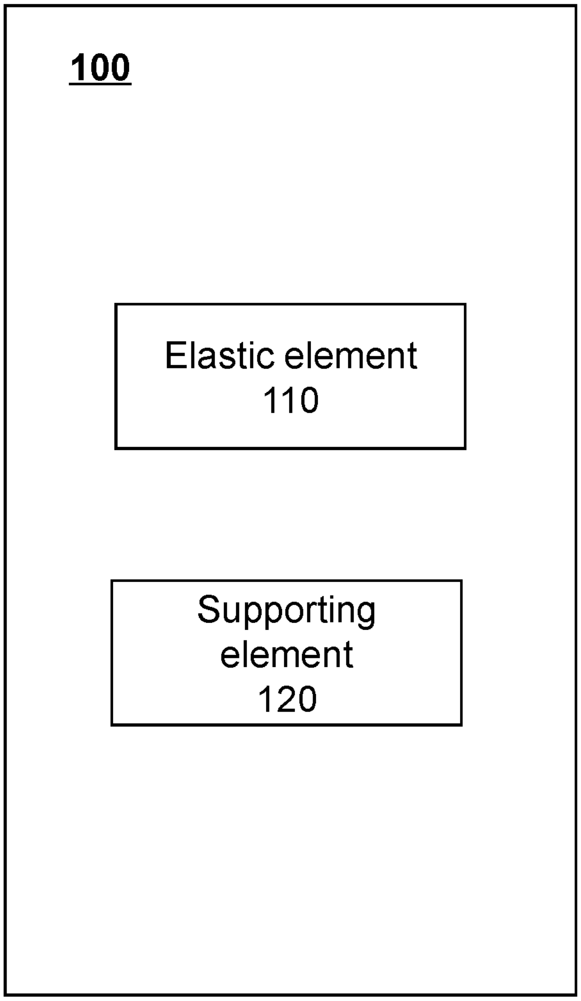
FIG. 1 is a block diagram illustrating an exemplary vibration component according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art may also apply the present disclosure to other similar scenarios. Unless obviously obtained from the context or the context illustrates otherwise, the same numeral in the drawings refers to the same structure or operation.

It should be understood that "system", "device", "unit" and/or "module" as used herein is a method for distinguishing different components, elements, components, portions, or assemblies of different levels. However, the words may be replaced by other expressions if other words may achieve the same purpose.

As indicated in the present disclosure and the claims, the terms "a", "an", "one" and/or "the" are not specific to the singular and may include the plural unless the context clearly indicates an exception. Generally speaking, the terms "including" and "comprising" only suggest the inclusion of clearly identified operations and elements, and these operations and elements do not constitute an exclusive list, and the method or device may also contain other operations or elements.

The flowchart is used in the present disclosure to illustrate the operations performed by the system according to the embodiment of the present disclosure. It should be understood that the preceding or following operations are not necessarily performed in the exact order. Instead, various operations may be processed in reverse order or simultaneously. At the same time, other operations may be added to these procedures, or a certain operation or operations may be removed from these procedures.

Some embodiments of the present disclosure provide a vibration component. The vibration component may vibrate in response to a mechanical vibration (e.g., the mechanical vibration of a driving unit). In some embodiments, the vibration component may be disposed in a speaker. The vibration component may vibrate under an action of the driving unit, and transmit an air conduction sound signal generated by the vibration to an outside of the speaker through a hole on a housing of the speaker. In some embodiments, the vibration component may include an elastic element and a supporting element. The supporting element may be connected with the elastic element and may support the elastic element. In some embodiments, the elastic element may include an enhanced region, one or more preprocessing regions, and a fixed region. The enhanced region may be disposed in the middle of the elastic element, and the one or more preprocessing regions may be disposed around a periphery of the enhanced region, the fixed region may be disposed around a periphery of the one or more preprocessing regions. The supporting element may be connected with the fixed region of the elastic element. In some embodiments, the supporting element may be disposed on any surface of the fixed region along a vibration direction of the enhanced region, and connected with the fixed region. In some embodiments, the one or more preprocessing regions may provide the enhanced region with one or more displacements along the vibration direction of the enhanced region as the elastic element vibrates. In some embodiments, the vibration displacement or a vibration amplitude provided by the one or more preprocessing regions for the enhanced region may superimposed by one or more displacements provided by the one or more preprocessing regions along the vibration direction of the enhanced region. A preprocessing region may be a region that is preprocessed on the elastic element, which has a stronger deformability than other regions that are not preprocessed (non-preprocessing regions) on the elastic element. In some embodiments, means of preprocessing may include but not limited to bending, changing a hardness of the material, etc. As the one or more preprocessing regions have stronger deformability than other regions on the elastic element, a total displacement of the enhanced region along the vibration direction of the enhanced region may be increases by disposing the one or more preprocessing regions. That is, the vibration displacement or the vibration amplitude may be increased by disposing the one or more preprocessing regions. In some embodiments, the elastic element may include a first preprocessing region that provides the enhanced region with a first displacement along the vibration direction of the enhanced region. The first displacement along the vibration direction of the enhanced region may be a displacement contributed by the first preprocessing region during the vibration of the enhanced region along the vibration direction of the enhanced region. In some embodiments, the elastic element may further include a second preprocessing region that provides the enhanced region with a second displacement along the vibration direction of the enhanced region. The second displacement along the vibration direction of the enhanced region may be a displacement contributed by the second preprocessing region during the vibration of the enhanced region along the vibration direction of the enhanced region. In some embodiments, the one or more preprocessing regions may include one or more bending rings (e.g., a first bending ring, a second bending ring, etc.). A deformation of the one or more bending rings subjected to the vibration may be greater than the deformation of the elastic element (non-bending ring) without preprocessing, thereby increasing the vibration displacement or the vibration amplitude of the enhanced region in the vibration direction of the enhanced region when the elastic element vibrates. As a result, a sensitivity of a vibration component response may be improved.

In some embodiments, when the vibration component is applied to the speaker, the one or more preprocessing regions of the elastic element (e.g., a bending ring) may increase the vibration displacement or the vibration amplitude of the enhanced region in the vibration direction of the enhanced region, thereby pushing more air to vibrate, which in turn improves a low frequency performance (e.g., the sensitivity) of the speaker. Moreover, by disposing one or more preprocessing regions (e.g., the bending rings) on the elastic element to improve the deformability of the elastic element, the elastic element may have a greater deformable quantity along the vibration direction of the enhanced region. As a result, when the vibration component has a greater vibration amplitude, the one or more preprocessing regions may disperse a stress generated by a vibration shock inside the one or more preprocessing regions through deformation, thereby preventing a stress concentration of the elastic elements, avoiding the vibration components (especially the elastic elements) from being damaged under the great vibration amplitude, and improving a reliability of the speaker.

FIG. 1 is a block diagram illustrating an exemplary vibration component according to some embodiments of the present disclosure. As shown in FIG. 1, a vibration component 100 may include an elastic element 110 and a supporting element 120.

The elastic element may be an element capable of elastic deformation under an action of an external load. In some embodiments, the elastic element may be a vibrating diaphragm. In some embodiments, the elastic element 110 may be made of a high temperature resistant material, so that the elastic element 110 maintains performance during a manufacturing process when the vibration component 100 is applied to a vibration sensor or a speaker. In some embodiments, when the elastic element 110 is in an environment of 200° C. to 300° C., a Young's modulus and a shear modulus of the elastic element 110 have no change or little change (e.g., the change may be within 5%). The Young's modulus may be used to indicate a deformation ability of the elastic element 110 when it is stretched or compressed, and the shear modulus may be used to indicate the deformation ability of the elastic element 110 when it is sheared. In some embodiments, the elastic element 110 may be made of a material with a good elasticity (i.e., prone to the elastic deformation), so that the vibration component 100 may have a good vibration response capability. In some embodiments, the material of the elastic element 110 may be one or more of an organic polymer material, a glue-like material, etc. In some embodiments, the organic polymer material may include a polycarbonate (PC), a polyamide (PA), an acrylonitrile-butadiene-styrene (ABS), a polystyrene (PS), a high impact polystyrene (HIPS), polypropylene (PP), a polyethylene terephthalate (PET), a polyvinyl chloride (PVC), polyurethane (PU), a polyethylene (PE), a phenolic resin (PF), an urea-formaldehyde (UF), a melamine-formaldehyde (MF), a polyarylate (PAR), a polyetherimide (PEI), polyimide (PI), a polyethylene naphthalate two formic acid glycol ester (PEN), polyetheretherketone (PEEK), a silica gel, etc., or any combination thereof. The PET refers to a kind of thermoplastic polyester, which is well formed, and the vibrating diaphragm made of the PET is often called a Mylar film. The PC has a strong impact resistance and a stable dimension after molding. The PAR is an advanced version of PC, mainly for environmental protection considerations. The PEI is softer than PET and has a higher internal damping. The PI has a high temperature resistance, a higher molding temperature, and a longer processing time. The PEN has a high strength and is relatively hard, which may be painted, dyed and plated. The PU is often used in a damping layer or a bending ring of a composite material, which has a high elasticity and a high internal damping. The PEEK is a newer type of material, which is resistant to friction and fatigue. It is worth noting that composite material may generally consider the features of various materials, such as a double-layer structure (e.g., generally hot-pressed PU to increase the internal resistance), a three-layer structure (e.g., a sandwich structure, an intermediate damping layer PU, an acrylic glue, a UV adhesive, a pressure-sensitive adhesive), a five-layer structure (e.g., two layers of films may be bonded by double-sided adhesive, the double-sided adhesive having a base layer, usually being the PET). In some embodiments, an organic polymer material may also be various glues, including but not limited to a gel, a silicone, an acrylic, a polyurethane, a rubber, an epoxy, a hot melt, a light curing, etc. Preferably, the organic polymer material may be the glue such as a silicone adhesive glue, or a silicone sealing glue.

In some embodiments, a Shore hardness of the elastic element 110 may be in a range of 1-50 HA. In some embodiments, the Shore hardness of the elastic element 110 may be in a range of 1-45 HA. In some embodiments, the Shore hardness of the elastic element 110 may be in a range of 1-40 HA. In some embodiments, the Shore hardness of the elastic element 110 may be in a range of 1-35 HA. In some embodiments, the Shore hardness of the elastic element 110 may be in a range of 1-30 HA. In some embodiments, the Shore hardness of the elastic element 110 may be in a range of 1-25 HA. In some embodiments, the Shore hardness of the elastic element 110 may be in a range of 1-20 HA. In some embodiments, the Shore hardness of the elastic element 110 may be in a range of 1-15 HA. In some embodiments, the Shore hardness of the elastic element 110 may be in a range of 1-10 HA. In some embodiments, the Shore hardness of the elastic element 110 may be in a range of 1-5 HA. In some embodiments, the Shore hardness of the elastic element 110 may be in a range of 14.9-15.1 HA.

In some embodiments, a projection of the elastic element 110 along a vibration direction of an enhanced region may be a regular and/or an irregular polygon such as a circle, a rectangle, a pentagon, a hexagon, etc.

In some embodiments, when the projection of the elastic element 110 along the vibration direction of the enhanced region is the rectangle, a projected dimension (e.g., a length or a width) of the elastic element 110 along the vibration direction of the enhanced region may be set within an appropriate range to ensure a performance of the vibration component 100. In some embodiments, the projection of the elastic element 110 along the vibration direction of the enhanced region is the rectangle, and the length of the rectangle may be in a range of 4 mm-12 mm. In some embodiments, the projection of the elastic element 110 along the vibration direction of the enhanced region is the rectangle, and the length of the rectangle may be in a range of 4.5 mm-11 mm. In some embodiments, the projection of the elastic element 110 along the vibration direction of the enhanced region is the rectangle, and the length of the rectangle may be in a range of 5 mm-10 mm. In some embodiments, the projection of the elastic element 110 along the vibration direction of the enhanced region is the rectangle, and the width of the rectangle may be in a range of 4 mm-10 mm. In some embodiments, the projection of the elastic element 110 along the vibration direction of the enhanced region is the rectangle, and the width of the rectangle may be in a range of 4.5 mm-9 mm. In some embodiments, the projection of the elastic element 110 along the vibration direction of the enhanced region is the rectangle, and the width of the rectangle may be in a range of 5 mm-8 mm.

In some embodiments, when the projection of the elastic element 110 along the vibration direction of the enhanced region is the circle, the projected dimension (e.g., a diameter) of the elastic element 110 along the vibration direction of the enhanced region may be set within an appropriate range to ensure the performance of the vibration component 100. In some embodiments, the projection of the elastic element 110 along the vibration direction of the enhanced region is the circle, and the diameter of the circle may be in a range of 4 mm-12 mm. In some embodiments, the projection of the elastic element 110 along the vibration direction of the enhanced region is the circle, and the diameter of the circle may be in a range of 4.2 mm-11.5 mm. In some embodiments, the projection of the elastic element 110 along the vibration direction of the enhanced region is the circle, and the diameter of the circle may be in a range of 4.5 mm-11 mm. In some embodiments, the projection of the elastic element 110 along the vibration direction of the enhanced region is the circle, and the diameter of the circle may be in a range of 4.7 mm-10.5 mm. In some embodiments, the projection of the elastic element 110 along the vibration direction of the enhanced region is the circle, and the diameter of the circle may be in a range of 5 mm-10 mm.

In some embodiments, when the projection of the elastic element 110 along the vibration direction of the enhanced region is the polygonal, the projected dimension (e.g., a diameter of a circumcircle of the polygon) of the elastic element 110 along the vibration direction of the enhanced region circumcircle may be set within an appropriate range to ensure the performance of the vibration component 100. In some embodiments, the projection of the elastic element 110 along the vibration direction of the enhanced region is the polygon, and the diameter of the circumcircle of the polygon may be in a range of 4 mm-12 mm. In some embodiments, the projection of the elastic element 110 along the vibration direction of the enhanced region is the polygon, and the diameter of the circumcircle of the polygon may be in a range of 4.2 mm-11.5 mm. In some embodiments, the projection of the elastic element 110 along the vibration direction of the enhanced region is the polygon, and the diameter of the circumcircle of the polygon may be in a range of 4.5 mm-11 mm. In some embodiments, the projection of the elastic element 110 along the vibration direction of the enhanced region is the polygon, and the diameter of the circumcircle of the polygon may be in a range of 4.7 mm-10.5 mm. In some embodiments, the projection of the elastic element 110 along the vibration direction of the enhanced region is the polygon, and the diameter of the circumcircle of the polygon may be in a range of 5 mm-10 mm.

In some embodiments, for the elastic elements 110 of different shapes (i.e., the elastic elements 110 with different projected shapes along the vibration direction of the enhanced region), thicknesses of the elastic elements 110 along the vibration direction of the enhanced region may be set within an appropriate range, so as to ensure the performance of the vibration component 100. In some embodiments, the thickness of the elastic element 110 along the vibration direction of the enhanced region may be in a range of 0.2 mm-1 mm. In some embodiments, the thickness of the elastic element 110 along the vibration direction of the enhanced region may be in a range of 0.25 mm-0.9 mm. In some embodiments, the thickness of the elastic element 110 along the vibration direction of the enhanced region may be in a range of 0.3 mm-0.8 mm. In some embodiments, the thickness of the elastic element 110 along the vibration direction of the enhanced region may be in a range of 0.3 mm-0.7 mm. In some embodiments, the thickness of the elastic element 110 along the vibration direction of the enhanced region may be in a range of 0.4 mm-0.6 mm.

In some embodiments, the elastic element 110 may include the enhanced region, a first preprocessing region, and a fixed region. The enhanced region may be disposed in the middle of the elastic element 110, the first preprocessing region may be disposed around a periphery of the enhanced region, and the fixed region may be disposed around a periphery of the first preprocessing region, so as to provide the enhanced region with a first displacement along the vibration direction of the enhanced region. The fixed region may be disposed around the periphery of the first preprocessing region, and the fixed region may be connected with the supporting element 120.

The first preprocessing region may be a preprocessing region on the elastic element. In some embodiments, the preprocessing may be changing a hardness of the material. In some embodiments, the first preprocessing region may be a region on the elastic element 110 whose hardness is smaller than other portions of the elastic element 110. As the hardness of the first preprocessing region is smaller than other portions of the elastic element 110, when the elastic element 110 vibrates, the first preprocessing region may be more prone to deformation, so that a deformation produced by the first preprocessing region may be greater than the deformation produced by other regions other than the one or more preprocessing regions (e.g., the first preprocessing region) on the component 110, thereby increasing the first displacement provided by the first preprocessing region along the vibration direction of the enhanced region of the enhanced region, thereby increasing the vibration amplitude or the vibration displacement of the enhanced region, and further improving the low frequency sensitivity of the vibration component 100. Moreover, as the first preprocessing region is more prone to deformation, the stress generated in the first preprocessing region is more prone to be dispersed in an entire first preprocessing region during the vibration of the elastic element 110, thereby avoiding a stress concentration on the first preprocessing region at some specific positions (e.g., a connection position between the fixed region and the supporting element 120), and preventing damage to the elastic element 110.

In some embodiments, the preprocessing may be a bending. In some embodiments, the first preprocessing region may include a first bending ring. The bending ring may be a structure with a bending portion protruding from a plane connecting both ends of the first preprocessing region with respect to the plane. The first bending ring may deform when the elastic element 110 vibrates, and the bending portion of the first bending ring may have a tendency to straighten during the vibration, so that the deformation generated by the first bending ring may be greater than the deformation of a non-bending region, i.e., a region other than the region of the bending ring (e.g., the region of the first bending ring) on the elastic element 110. As a result, the first displacement provided by the first preprocessing region for the enhanced region along the vibration direction of the enhanced region may be increased. In some embodiments, a component of a dimension of the deformed first bending ring corresponding to the vibration direction of the enhanced region during the vibration process may be the first displacement. During the vibration of the elastic element 110, as the first bending ring may produce a greater deformation through the straightening tendency of the bending portion, the first bending ring may more easily disperse the stress generated in the first preprocessing region on the first bending ring, thereby avoiding the stress concentration in some specific positions and preventing the elastic element 110 from being damaged.

As the one or more preprocessing regions are more prone to deformation than other regions of the elastic element 110, by disposing the first preprocessing region, a total stiffness of the elastic element 110 may be reduced, and a compliance of the vibration component 100 may be improved. When a mass of the elastic element 110 remains unchanged, a resonance peak f0 of the vibration component 100 may be moved forward (i.e., moved to the low frequency), thereby improving the low frequency sensitivity of the vibration component 100.

In some embodiments, a shape of a cross-section of the first bending ring and/or the second bending ring parallel to the vibration direction of the enhanced region includes one or more of an arc shape, an elliptical arc shape, a broken line shape, a pointed tooth shape, or a square tooth shape.

In some embodiments, the first bending ring may have a first bending direction. The first bending direction may be a direction that is perpendicular to a line segment connecting the two ends of the first bending ring and points toward the bending portion on a projection plane parallel to the vibration direction of the enhanced region. In some embodiments, when the shape of the cross-section of the first bending ring on the projection plane parallel to the vibration direction of the enhanced region is an arc shape, the first bending direction may be a direction perpendicular to a line segment connecting the two ends of the arc and towards a raised portion of the arc (i.e., the bending portion). In some embodiments, the first bending direction may be parallel to the vibration direction of the enhanced region. In some embodiments, the first bending direction may be perpendicular to the vibration direction of the enhanced region. In some embodiments, the first bending direction and the vibration direction of the enhanced region may form a first included angle. For more descriptions about the first preprocessing region, please refer to FIGS. 2-6 and the related descriptions of the present disclosure.

In some embodiments, the elastic element 110 may further include a second preprocessing region, and the second preprocessing region may be disposed around the periphery of the first preprocessing region. In some embodiments, the second preprocessing region may be directly connected with the first preprocessing region, that is, a distance between the second preprocessing region and the first preprocessing region may be zero. In some embodiments, the second preprocessing region and the first preprocessing region may also be disposed at intervals, that is, there may be a preset distance (e.g., 10 microns, 100 microns, etc.) between the second preprocessing region and the first preprocessing region. In some embodiments, the second preprocessing region may provide the enhanced region with a second displacement along the vibration direction of the enhanced region. The second displacement may be a magnitude of displacement contributed by the second preprocessing region to the enhanced region in the vibration direction of the enhanced region during the vibration of the elastic element 210.

In some embodiments, the second preprocessing region may be another preprocessing region on the elastic element other than the first preprocessing region, so that when the elastic element 110 vibrates, the deformation produced by the second preprocessing region may be greater than the deformation produced by other regions of the elastic element 110 other than the one or more preprocessing regions (e.g., the first and the second preprocessing regions). In some embodiments, the second preprocessing region may have a similar structure as the first preprocessing zone.

In some embodiments, the second preprocessing region may include a second bending ring. The second bending ring may deform when the elastic element 110 vibrates, and the bending portion of the second bending ring may have a tendency to straighten during the vibration, so that the deformation generated by the second bending ring may be greater than the deformation generated by the non-bending ring area, thereby increasing the second displacement provided by the second preprocessing region for the enhanced region along the vibration direction of the enhanced region. The component of the dimension of the deformed second bending ring along the vibration direction of the enhanced region during the vibration process may be the second displacement. In some embodiments, a shape of a cross-section of the second bending ring parallel to the vibration direction of the enhanced region may include but be not limited to, one or more of an arc shape, an elliptical arc shape, a broken line shape, a pointed tooth shape, or a square tooth shape.

In some embodiments, the second bending ring may have a second bending direction. The second bending direction may be a direction perpendicular to a line segment connecting the two ends of the second bending ring and towards the direction of the bending portion protruding from the plane on any projection plane parallel to the vibration direction of the enhanced region. In some embodiments, the second bending direction may be the same as or different (e.g., opposite, perpendicular, etc.) from the first bending direction. The second bending direction being opposite to the first bending direction means that a protruding direction of the bending portion of the first bending ring is opposite to a protruding direction of the bending portion of the second bending ring within the same plane. In some embodiments, when the first bending ring and the second bending ring are smooth curves (a curvature of a smooth curve is not equal to 0, and a first derivative of the smooth curve is continuous), a center of curvature corresponding to any point on the first bending ring and a center of curvature corresponding to any point on the second bending ring may be respectively located on both sides of the elastic element, then the second bending direction may be opposite to the first bending direction. In some embodiments, for more descriptions about the second preprocessing region, please refer to FIGS. 7-18 of the present disclosure, and the related descriptions.

In some embodiments, the elastic element 110 may also include a non-preprocessing region. In some embodiments, when the first preprocessing region and the second preprocessing region are disposed at intervals, the region connecting the first preprocessing region and the second preprocessing region may be the non-preprocessing region. In some embodiments, when the first preprocessing region and the enhanced region are disposed at intervals, the region connecting the first preprocessing region and the enhanced region may be the non-preprocessing region.

In some embodiments, when the elastic element 110 vibrates, the non-preprocessing region may also be deformed to provide the displacement for the vibration displacement or the vibration amplitude of the enhanced region. In some embodiments, the deformation of the non-preprocessing region depends on parameters of the material of the elastic element 110 (e.g., the Young's modulus), which provides a displacement much smaller than the first displacement or the second displacement when the elastic element 110 vibrates. In some embodiments, when the enhanced region, the first preprocessing region, and the second preprocessing region are all directly connected (instead of being spaced apart), the elastic element 110 may not include the non-preprocessing region.

In some embodiments, the vibration component 100 may include the supporting element 120. The supporting element 120 may be connected with the fixed region of the elastic element 110. In some embodiments, the supporting element 120 may include a clamping portion and a deformation portion. The clamping portion and the defamation portion may be disposed opposite to each other, and may be respectively located on two surfaces of the fixed region of the elastic element 110 along the vibration direction of the enhanced region, so that the fixed region may be clamped between the clamping portion and the defamation portion of the supporting element 120. In some embodiments, the supporting element 120 may not include the clamping portion. In this case, the deformation portion may be disposed on any surface of the fixed region of the elastic element 110 along the vibration direction of the enhanced region, and connected (e.g., bonded) with the fixed region. In some embodiments, the supporting element 120 (e.g., the deformation portion) may be stretchable along the vibration direction of the enhanced region, so that when the elastic element 110 vibrates, it provides the enhanced region with a third displacement along the vibration direction of the enhanced region by stretching deformation. The third displacement may be a magnitude of the displacement contributed by the supporting element 120 for the enhanced region along the vibration direction of the enhanced region during the vibration of the elastic element 210.

In some embodiments, the material of the supporting element 120 may be one or more of a rigid material, a semiconductor material, an organic polymer material, a glue-like material, etc. In some embodiments, the rigid material may include but be not limited to, a metal material, an alloy material, etc. The semiconductor material may include but be not limited to, one or more of a silicon, a silicon dioxide, a silicon nitride, a silicon carbide, etc. The organic polymer material may include but not limited to one or more of a polyimide (PI), a parylene, a polydimethylsiloxane (PDMS), a hydrogel, etc. The glue material may include but not limited to one or more of a gel, a silicone, an acrylic, a polyurethane, a rubber, an epoxy, a hot melt, a light curing, etc. In some embodiments, in order to enhance a connection force between the supporting element 120 and the elastic element 110, and improve a reliability between the supporting element 120 and the elastic element 110, the material of the supporting element 120 may be a silicone adhesive glue, an organic Silicone sealing glue, etc. In some embodiments, the shape of the cross-section of the supporting element 120 parallel to the vibration direction of the enhanced region may be a regular and/or irregular geometric shape, such as a rectangle, a circle, an ellipse, and a pentagon. In this case, by disposing the flexible supporting element 120, the elastic element 110 may not be in direct contact with a housing, and the stress concentration at the connection between the elastic element 110 and the housing may be reduced (the housing is generally a rigid body), thereby further protecting the elastic element 110.

In some embodiments, according to requirements for the vibration component 100 (e.g., an overall dimension of the vibration component 100, the vibration displacement or the vibration amplitude of the enhanced region in the vibration direction of the enhanced region), a height of the supporting element 120 along the vibration direction of the enhanced region may be reasonably set. In some embodiments, a height of the deformation portion of the supporting element 120 along the vibration direction of the enhanced region may be in a range of 50 um-1000 um. In some embodiments, the height of the deformation portion of the supporting element 120 along the vibration direction of the enhanced region may be in a range of 60 um-950 um. In some embodiments, the height of the deformation portion of the supporting element 120 along the vibration direction of the enhanced region may be in a range of 80 um-900 um. In some embodiments, the height of the deformation portion of the supporting element 120 along the vibration direction of the enhanced region may be in a range of 90 um-850 um. In some embodiments, the height of the deformation portion of the supporting element 120 along the vibration direction of the enhanced region may be in a range of 100 um-800 um.

In some embodiments, the cross-sections of the supporting element 120 perpendicular to the vibration direction of the enhanced region may have different cross-sectional areas along the vibration direction of the enhanced region. For example, the supporting element 120 may be provided with a bending structure on a side near the enhanced region in a direction perpendicular to the vibration direction of the enhanced region (also referred to as an inner side of the supporting element 120), so that the cross-sectional area of the inner side of the supporting element 120 may be greater than the cross-sectional area of an outer surface of the supporting element 120 (a side of the supporting element 120 away from the enhanced region in a direction perpendicular to the vibration direction of the enhanced region).

In some embodiments, the supporting element 120 may be deformed in response to the vibration signal of the elastic element 110, so as to provide the enhanced region with the third displacement along the vibration direction of the enhanced region, thereby increasing the total displacement of the enhanced region in the vibration direction of the enhanced region, and further improving the low frequency sensitivity of the vibration component 100. For more descriptions about the supporting element 120, please refer to FIGS. 19-28 of the present disclosure, and the related descriptions thereof.

Figure 2:
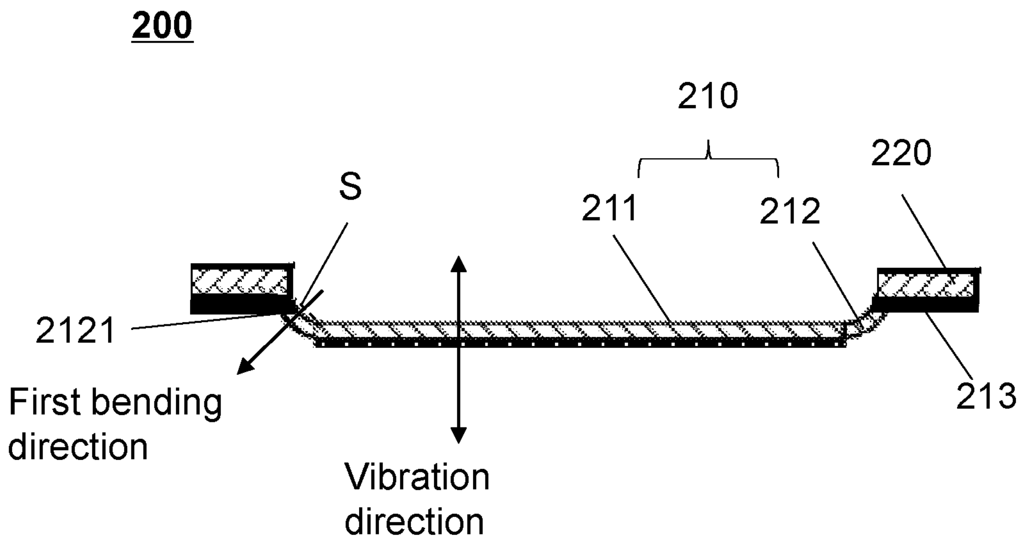
FIG. 2 is a structural diagram illustrating an exemplary vibration component according to some embodiments of the present disclosure.

FIG. 2-FIG. 6 are structural diagrams illustrating exemplary vibration components according to some embodiments of the present disclosure;

As shown in FIG. 2, a vibration component 200 may include an elastic element 210 and a supporting element 220. In some embodiments, the elastic element 210 may include an enhanced region 211, a first preprocessing region 212, and a fixed region 213. The enhanced region 211 may be located in the middle of the elastic element 210, the first preprocessing region 212 may be disposed around a periphery of the enhanced region 211, and the fixed region 213 may be disposed around a periphery of the first preprocessing region 212. The supporting element 220 may be connected with the elastic element 210 through the fixed region 213.

In some embodiments, during the vibration of the elastic element 210, the first preprocessing region 212 may be deformed to a certain degree along a vibration direction of the enhanced region 211, thereby providing the enhanced region 211 with a first displacement along the vibration direction of the enhanced region 211, and further increasing the displacement generated by the enhanced region 211 along the vibration direction of the enhanced region.

In some embodiments, projections of the elastic element 210 and the enhanced region 211 along the vibration direction of the enhanced region 211 may have regular shapes or irregular shapes such as circles, rectangles, rectangles with rounded corners, pentagons, hexagons, etc. The projections of the first preprocessing region 212 and the fixed region 213 of the elastic element 210 along the vibration direction of the enhanced region 211 may be regular and/or irregular polygon rings such as circular rings, rectangular rings, pentagonal rings, hexagonal rings, etc. corresponding to regular and/or irregular polygons such as circles, rectangles, pentagons, hexagons, etc.

In some embodiments, different shapes of the enhanced region 211 may have different dimensions. In some embodiments, when the projection of the enhanced region 211 along the vibration direction of the enhanced region 211 is the rectangle, a length of the rectangle may be in a range of 2.5 mm-8 mm. In some embodiments, the projection of the enhanced region 211 along the vibration direction of the enhanced region 211 may be the rectangle, and the length of the rectangle may be in a range of 2.6 mm-7.5 mm. In some embodiments, the projection of the enhanced region 211 along the vibration direction of the enhanced region 211 may be the rectangle, and the length of the rectangle may be in a range of 2.7 mm-7 mm. In some embodiments, the projection of the enhanced region 211 along the vibration direction of the enhanced region 211 may be the rectangle, and the length of the rectangle may be in a range of 2.8 mm-6.5 mm. In some embodiments, the projection of the enhanced region 211 along the vibration direction of the enhanced region 211 may be the rectangle, and the length of the rectangle may be in a range of 3 mm-6 mm. In some embodiments, when the projection of the enhanced region 211 along the vibration direction of the enhanced region 211 is the rectangle, a width of the rectangle of the enhanced region 211 along the vibration direction of the enhanced region 211 may be in a range of 1 mm-6 mm. In some embodiments, the projection of the enhanced region 211 along the vibration direction of the enhanced region 211 may be the rectangle, and the width of the rectangle may be in a range of 1.2 mm-5.8 mm. In some embodiments, the projection of the enhanced region 211 along the vibration direction of the enhanced region 211 may be the rectangle, and the width of the rectangle may be in a range of 1.5 mm-5.5 mm. In some embodiments, the projection of the enhanced region 211 along the vibration direction of the enhanced region 211 may be the rectangle, and the width of the rectangle may be in a range of 1.7 mm-5.3 mm. In some embodiments, the projection of the enhanced region 211 along the vibration direction of the enhanced region 211 may be the rectangle, and the width of the rectangle may be in a range of 2 mm-5 mm.

In some embodiments, when the projection of the enhanced region 211 along the vibration direction of the enhanced region 211 is the circle, a diameter of the circle may be in a range of 2 mm-10 mm. In some embodiments, the projection of the enhanced region 211 along the vibration direction of the enhanced region 211 may be the circle, and the diameter of the circle may be in a range of 2.2 mm-9.5 mm. In some embodiments, the projection of the enhanced region 211 along the vibration direction of the enhanced region 211 may be the circle, and the diameter of the circle may be in a range of 2.5 mm-9 mm. In some embodiments, the projection of the enhanced region 211 along the vibration direction of the enhanced region 211 may be the circle, and the diameter of the circle may be in a range of 2.7 mm-8.5 mm. In some embodiments, the projection of the enhanced region 211 along the vibration direction of the enhanced region 211 may be the circle, and the diameter of the circle may be in a range of 3 mm-8 mm.

In some embodiments, when the projection of the enhanced region 211 along the vibration direction of the enhanced region 211 is the polygon, a diameter of a circumcircle of the polygon may be in a range of 2 mm-10 mm. In some embodiments, the projection of the enhanced region 211 along the vibration direction of the enhanced region 211 may be the polygon, and the diameter of the circumcircle of the polygon may be in a range of 2.2 mm-9.5 mm. In some embodiments, the projection of the enhanced region 211 along the vibration direction of the enhanced region 211 may be the polygon, and the diameter of the circumcircle of the polygon may be in a range of 2.5 mm-9 mm. In some embodiments, the projection of the enhanced region 211 along the vibration direction of the enhanced region 211 may be the polygon, and the diameter of the circumcircle of the polygon may be in a range of 2.7 mm-8.5 mm. In some embodiments, the projection of the enhanced region 211 along the vibration direction of the enhanced region 211 may be the polygon, and the diameter of the circumcircle of the polygon may be in a range of 3 mm-8 mm.

In some embodiments, for the enhanced regions 211 of different shapes (that is, the enhanced regions 211 have different projected shapes along the vibration direction of the enhanced region 211), thicknesses of the enhanced regions 211 along the vibration direction of the enhanced region 211 may be set within an appropriate range to ensure a performance of the vibration component 200. In some embodiments, the thickness of the enhanced region 211 along the vibration direction of the enhanced region 211 may be 20 um-200 um. In some embodiments, the thickness of the enhanced region 211 along the vibration direction of the enhanced region 211 may be in a range of 25 um-190 um. In some embodiments, the thickness of the enhanced region 211 along the vibration direction of the enhanced region 211 may be in a range of 30 um-180 um. In some embodiments, the thickness of the enhanced region 211 along the vibration direction of the enhanced region 211 may be in a range of 35 um-170 um. In some embodiments, the thickness of the enhanced region 211 along the vibration direction of the enhanced region 211 may be in a range of 40 um-150 um.

In some embodiments, a material of the enhanced region 211 may be one or more of a metal film, a non-metal, etc. In some embodiments, the metal film may include but not limited to an aluminum alloy, a magnesium aluminum alloy, a titanium alloy, a magnesium lithium alloy, copper, beryllium, 85 steel, etc., or any combination thereof. In some embodiments, the non-metal may include but not limited to artificial and/or natural silk products (e.g., a silk, a natural silk, etc.), a rayon, a silk film, a cloth film, a nylon film, a pure carbon fiber, a composite carbon fiber, etc., or any combination thereof.

Figure 3:
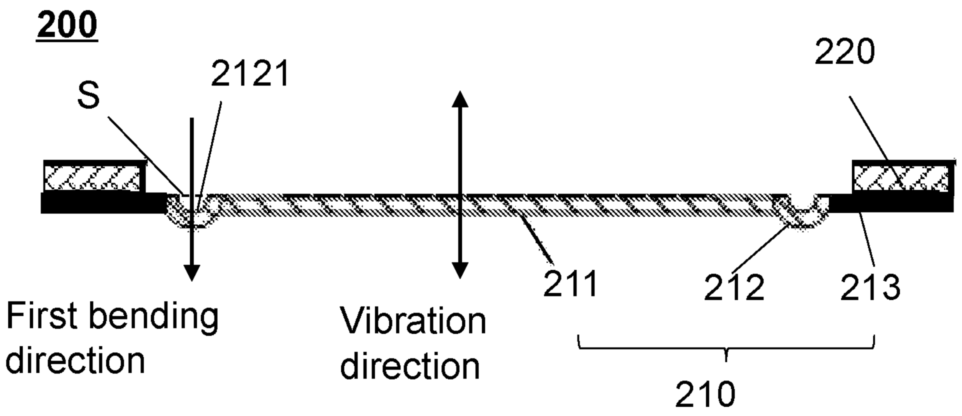
FIG. 3 is a structural diagram illustrating an exemplary vibration component according to some embodiments of the present disclosure.
Figure 4:
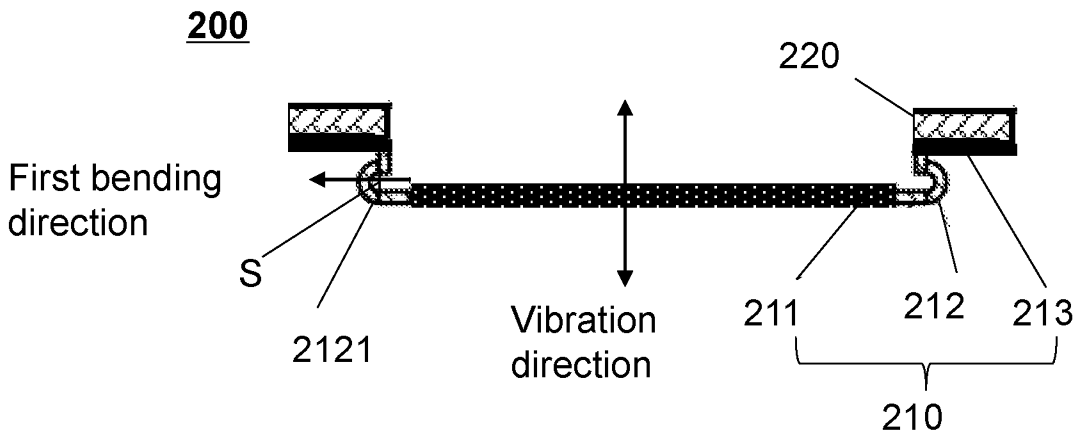
FIG. 4 is a structural diagram illustrating an exemplary vibration component according to some embodiments of the present disclosure.

In some embodiments, the first preprocessing region 212 may include a first bending ring 2121, and the first bending ring 2121 may have a first bending direction. Referring to FIGS. 2-4, the first bending direction may be a direction that is perpendicular to a line segment S connecting the two ends of the first bending ring 2121 and points toward the bending portion on a projection plane parallel to the vibration direction of the enhanced region 211.

In some embodiments, referring to FIG. 2, one end of the first bending ring 2121 may be connected with the enhanced region 211, and the other end of the first bending ring 2121 may protrude beyond a surface of the enhanced region 211 perpendicular to the vibration direction. In some embodiments, the first bending direction and the vibration direction of the enhanced region 211 may form a first included angle. When the first bending direction forms the first included angle with the vibration direction of the enhanced region 211, the first bending ring 2121 may be deformed in the first bending direction (or the direction perpendicular to the first bending direction), and the deformation formed along the first bending direction (or the direction perpendicular to the first bending direction) may have a certain deformation component along the vibration direction of the enhanced region 211. The deformation component may make the first preprocessing region 212 provide the enhanced region 211 with a first displacement along the vibration direction of the enhanced region 211.

In some embodiments, the first bending ring 2121 may be an arc-shaped bending ring (e.g., a circular arc bending ring, an elliptical arc bending ring, etc.). In some embodiments, the first bending ring 2121 may also be a curved bending ring (e.g., a parabola bending ring, etc.). In some embodiments, the first bending ring 2121 may also be a polyline bending ring (e.g., a sharp toothed polyline bending ring, a square toothed polyline bending ring, etc.).

By designing the first bending ring 2121, the elastic element 210 may have a greater deformability along the vibration direction of the enhanced region 211, thereby increasing the first displacement provided by the first preprocessing region 212 for the enhanced region 211 along the vibration direction of the enhanced region 211, and further increasing a vibration amplitude or a vibration displacement of the enhanced region 211 in the vibration direction of the enhanced region 211, so as to improve a low frequency sensitivity of the vibration component 200. In some embodiments, by designing the first bending ring 2121, when the elastic element 210 vibrates, the entire bending portion of the first bending ring 2121 may obtain a relatively uniform deformation, which greatly reduces stress concentration, thereby improving a reliability of the vibration component 200.

In some embodiments, the first included angle formed by the first bending direction and the vibration direction of the enhanced region 211 may be in a range of 0°-360°. In some embodiments, the first included angle formed by the first bending direction and the vibration direction of the enhanced region 211 may be in a range of 0°-180°. In some embodiments, the first included angle formed by the first bending direction and the vibration direction of the enhanced region 211 may be in a range of 10°-170°. In some embodiments, the first included angle formed by the first bending direction and the vibration direction of the enhanced region 211 may be in a range of 40°-140°. In some embodiments, the first included angle formed by the first bending direction and the vibration direction of the enhanced region 211 may be in a range of 60°-120°.

In some embodiments, referring to FIG. 3, relative to the enhanced region 211, the first bending ring 2121 may be disposed around the enhanced region 211 along the vibration direction of the enhanced region 211 perpendicular to the enhanced region 211. In some embodiments, the first bending direction and the vibration direction of the enhanced region 211 may be parallel. When the first bending direction is parallel to the vibration direction of the enhanced region 211, the first bending ring 2121 may be deformed in the first bending direction, that is, the first bending ring 2121 may be deformed along the vibration direction of the enhanced region 211, thereby making the first preprocessing region 212 provide the enhanced region 211 with the first displacement along the vibration direction of the enhanced region 211. When the first bending direction is parallel to the vibration direction of the enhanced region 211, the first displacement may be a component of a length of the deformed first preprocessing region 212 (the length connecting the two ends of the first preprocessing region 212 on the projection plane parallel to the vibration direction of the enhanced region 211) along the vibration direction. According to the Pythagorean theorem, the component may be greater than a change in the length of the deformed first preprocessing region 212 (i.e., the deformation quantity). That is, by disposing the first bending direction parallel to the vibration direction of the enhanced region 211, the first displacement provided by the first preprocessing region 212 may be greater than its own deformation, which increases the vibration displacement or the vibration amplitude of the enhanced region 211.

In order to ensure a required resonant frequency of the vibration component 200, when a total size of the vibration component 200 is constant, the greater the projected dimension of the enhanced region 211 along the vibrating direction of the enhanced region 211 is, the better it is. In the case that the total dimension of the vibration component 200 is constant, when the projected dimension of the enhanced region 211 along the vibration direction of the enhanced region 211 is greater, a disposable space of the first bending ring 2121 around the enhanced region 211 may be reduced. Further, an reduce of the dimension of the first bending ring 2121 may result in an increase in a stiffness of the elastic element 210 and an increase in the resonant frequency of a device. In some embodiments, referring to FIG. 4, the first bending ring 2121 may be disposed on the side of the enhanced region 211 parallel to the vibration direction of the enhanced region 211. In some embodiments, the first bending direction may be perpendicular to the vibration direction of the enhanced region 211. In some embodiments, the first bending direction may be perpendicular to the vibration direction of the enhanced region 211 and away from the direction where the enhanced region 211 is located. When the first bending direction is perpendicular to the vibration direction of the enhanced region 211, the first bending ring 2121 may be deformed in a direction perpendicular to the first bending direction. That is, the first bending ring 2121 may be deformed along the vibration direction of the enhanced region 211, so as to increase the first displacement provided by the first preprocessing region 212 for the enhanced region 211 along the vibration direction of the enhanced region 211. When the first bending direction is perpendicular to the vibration direction of the enhanced region 211, the first displacement may be a change in the length of the deformed first preprocessing region 212 (i.e., a deformation quantity).

Compared with other non-perpendicular disposals, by disposing the first bending direction to be perpendicular to the vibration direction of the enhanced region 211, the first bending ring 2121 may have a greater designing dimension, so that a deformability of the first bending ring 2121 along the vibration direction of the enhanced region 211 may be greatly improved (that is, the first bending ring 2121 may have a greater deformation). As a result, the stiffness of the elastic element 210 along the vibration direction of the enhanced region 211 may be greatly reduced, and at the same time, the projected dimension of the first bending ring 2121 along the enhanced region 211 may be reduced.

In some embodiments, in order to increase the deformation of the first bending ring 2121 during the vibration of the enhanced region 211, referring to FIGS. 2-4, a height of the first bending ring 2121 along the first bending direction and a length of the first bending ring 2121 along the direction perpendicular to the first bending direction may be reasonably set to meet the requirement of the displacement of the enhanced region 211 along the vibration direction of the enhanced region 211. In some embodiments, the height of the first bending ring 2121 along the first bending direction may be represented using a maximum value of a distance dimension of the bending portion of the first bending ring 2121 along the first bending direction from the line segment S on the projection plane parallel to the vibration direction of the enhanced region 211. The length of the first bending ring 2121 along the direction perpendicular to the first bending direction may be represented using a distance dimension (i.e., the length of the line segment S) of a straight line connecting the two ends of the first bending ring 2121 on the projection plane parallel to the vibration direction of the enhanced region 211.

In some embodiments, a height of the projected shape of the first bending ring 2121 on the projection plane parallel to the vibration direction of the enhanced region 211 may be in a range of 50 um-250 um. In some embodiments, the height of the projected shape of the first bending ring 2121 on the projection plane parallel to the vibration direction of the enhanced region 211 may be in a range of 60 um-240 um. In some embodiments, the height of the projected shape of the first bending ring 2121 on the projection plane parallel to the vibration direction of the enhanced region 211 may be in a range of 70 um-220 um. In some embodiments, the height of the projected shape of the first bending ring 2121 on the projection plane parallel to the vibration direction of the enhanced region 211 may be in a range of 80 um-200 um. In some embodiments, in the projected shape of the first bending ring 2121 on the projection plane parallel to the vibration direction of the enhanced region 211, a dimension along a radial direction of the projected shape or a radial direction of the circumcircle of the projected shape may be defined as the length of the first bending ring 2121. In some embodiments, the length of the projected shape of the first bending ring 2121 on the projection plane parallel to the vibration direction of the enhanced region 211 may be in a range of 400 um-800 um. In some embodiments, the length of the projected shape of the first bending ring 2121 on the projection plane parallel to the vibration direction of the enhanced region 211 may be in a range of 430 um-770 um. In some embodiments, the length of the projected shape of the first bending ring 2121 on the projection plane parallel to the vibration direction of the enhanced region 211 may be in a range of 460 um-740 um. In some embodiments, the length of the projected shape of the first bending ring 2121 on the projection plane parallel to the vibration direction of the enhanced region 211 may be in a range of 500 um-700 um. In some embodiments, a ratio of the height to the length of the projected shape of the first bending ring 2121 on the projection plane parallel to the vibration direction of the enhanced region 211 may be in a range of 1:16-5:8. In some embodiments, the ratio of the height to the length of the projected shape of the first bending ring 2121 on the projection plane parallel to the vibration direction of the enhanced region 211 may be in a range of 1:8-1:2. In some embodiments, the ratio of the height to the length of the projected shape of the first bending ring 2121 on the projection plane parallel to the vibration direction of the enhanced region 211 may be in a range of 1:4-3:4.

In some embodiments, the first displacement along the vibration direction of the enhanced region 211 provided by the first preprocessing region 212 (the first bending ring 2121) for the enhanced region 211 may be in a range of 1 um-50 um. In some embodiments, the first displacement along the vibration direction of the enhanced region 211 provided by the first preprocessing region 212 (the first bending ring 2121) for the enhanced region 211 may be in a range of 2 um-45 um. In some embodiments, the first displacement along the vibration direction of the enhanced region 211 provided by the first preprocessing region 212 (the first bending ring 2121) for the enhanced region 211 may be in a range of 3 um-40 um. In some embodiments, the first displacement along the vibration direction of the enhanced region 211 provided by the first preprocessing region 212 (the first bending ring 2121) for the enhanced region 211 may be in a range of 3.5 um-35 um. In some embodiments, the first displacement along the vibration direction of the enhanced region 211 provided by the first preprocessing region 212 (the first bending ring 2121) for the enhanced region 211 may be in a range of 4 um-30 um.

Figure 5:
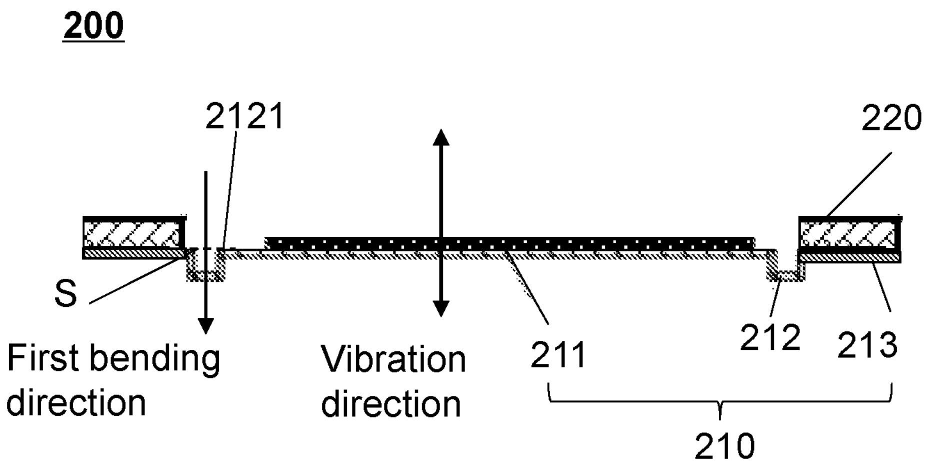
FIG. 5 is a structural diagram illustrating an exemplary vibration component according to some embodiments of the present disclosure.
Figure 6:
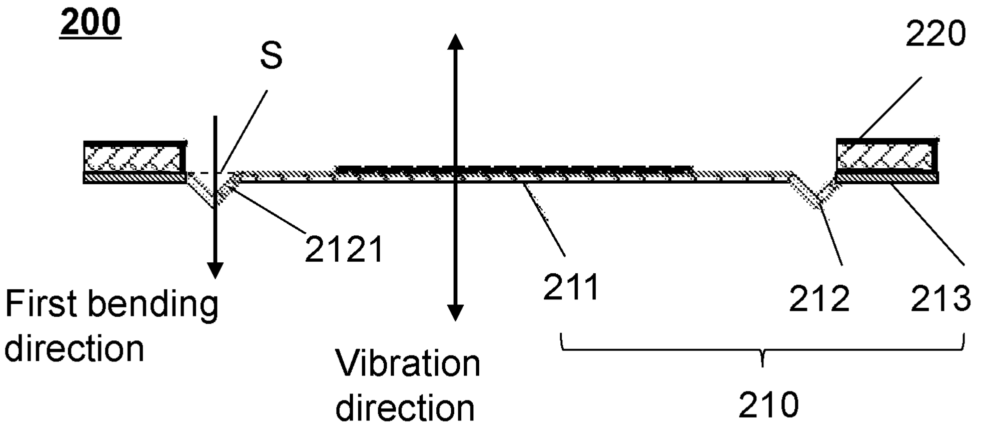
FIG. 6 is a structural diagram illustrating an exemplary vibration component according to some embodiments of the present disclosure.

In some embodiments, referring to FIGS. 2-6, the shape of the cross-section of the first bending ring 2121 parallel to the vibration direction of the enhanced region 211 may include but be not limited to, one or more of an arc shape, an elliptical arc shape, a broken line shape, a pointed tooth shape, or a square tooth shape. For example, as shown in FIGS. 2-4, the shape of the cross-section of the first bending ring 2121 on the cross-section parallel to the vibration direction of the enhanced region 211 may be the arc shape. As another example, as shown in FIG. 5, the shape of the cross-section of the first bending ring 2121 on the cross-section parallel to the vibration direction of the enhanced region 211 may be the square tooth shape. As another example, as shown in FIG. 6, the shape of the cross-section of the first bending ring 2121 on the cross-section parallel to the vibration direction of the enhanced region 211 may be the pointed tooth shape.

In some embodiments, along the vibration direction of the enhanced region 211, the first bending rings 2121 with different shapes of the cross-sections may have different deformability, so that the first displacements along the vibration direction of the enhanced region 211 provided by the preprocessing region 212 for the enhanced region 211 may be different. In some embodiments, according to requirements for the first displacement along the vibration direction of the enhanced region 211 provided by the preprocessing region 212 for the enhanced region 211, the shape of the cross-section of the first bending ring 2121 may be set accordingly. The embodiments of the present disclosure make no limitation on that.

In some embodiments, referring to FIGS. 2-6, the supporting element 220 may be located on any surface of the fixed region 213 along the vibration direction of the enhanced region 211, and may be connected (e.g., bonded) to the fixed region 213. In some embodiments, when the vibration component 200 is disposed in the speaker, the supporting element 220 may be connected with other structures of the speaker (e.g., a housing) to support the elastic element 210.

In some embodiments, the material of the supporting element 220 may be one or more of a semiconductor material, an organic polymer material, a glue-like material, etc. The semiconductor material may include but be not limited to, one or more of a silicon, a silicon dioxide, a silicon nitride, a silicon carbide, etc. The organic polymer material may include but not limited to one or more of a PI, a parylene, a PDMS, a hydrogel, a plastic, etc. The glue material may include but not limited to one or more of a gel, a silicone, an acrylic, a polyurethane, ta rubber, an epoxy, a hot melt, a light curing, etc. In some embodiments, in order to enhance a connection force between the supporting element 220 and the elastic element 210 (the fixed region 213) and improve the reliability between the supporting element 220 and the elastic element 210, the material of the supporting element 220 may be a silicone bonding glue, a silicone sealing glue, etc. In some embodiments, the material of the supporting element 220 may also be a rigid material. In some embodiments, the rigid material may include but be not limited to, metal material, alloy material, etc.

In some embodiments, the supporting element 220 may also be deformed to a certain extent along the vibration direction of the enhanced region 221, so as to provide the enhanced region 221 with a displacement along the vibration direction of the enhanced region 221. In some embodiments, the supporting element 220 may include a deformation portion. The deformable portion may have a certain deformability along the vibration direction of the enhanced region 211, so as to provide the enhanced region 221 with the displacement along the vibration direction of the enhanced region 221, thereby increasing the vibration amplitude or the vibration displacement of the enhanced region 211 along the vibration direction of the enhanced region 211, and improving the low frequency sensitivity of the vibration component 200. For descriptions about the supporting element 220, please refer to FIGS. 19-28 and the related descriptions.

FIGS. 7-18 are structural diagrams illustrating exemplary vibration components according to some embodiments of the present disclosure.

In some embodiments, one or more elements of a vibration component 700 (e.g., an enhanced region 711, a first preprocessing region 712, a fixed region 714, a supporting element 720, etc.) may be the same as or similar to the one or more elements (e.g., the enhanced region 211, the first preprocessing region 212, the fixed region 213, the supporting element 220, etc.) of the vibration component 200 described in FIGS. 2-6. That is, the vibration component 700 may include the enhanced region 711, the first preprocessing region 712, the fixed region 714, and the supporting element 720. A difference between the vibration component 200 and the vibration component 700 is that the elastic element 710 of the vibration component 700 may further include a second preprocessing region 713. The second preprocessing region 713 may provide the enhanced region 711 with a second displacement along a vibration direction of the enhanced region 711. The second displacement may be a magnitude of displacement contributed by the second preprocessing region 713 to the enhanced region 711 in the vibration direction of the enhanced region 711 during the vibration of the vibration component 700.

In some embodiments, by disposing the second preprocessing region 713 of the elastic element 710, the second displacement along the vibration direction of the enhanced region 711 may be provided for the enhanced region 711, thereby further increasing the vibration displacement or the vibration amplitude (including the first displacement and the second displacement) of the enhanced region 711 along the vibration direction of the enhanced region 711. The increasing of the vibration displacement or a vibration amplitude of the enhanced region 711 along the vibration direction of the enhanced region 711 may make the elastic element 710 push more air to vibrate when the vibration component 700 vibrates, thereby improving a low frequency sensitivity of the vibration component 700. In some embodiments, when the vibration amplitude of the vibration component 700 is great, the first preprocessing region 712 and the second preprocessing region 713 may respectively store a vibration impact energy inside the first preprocessing region 712 and the second preprocessing region 713 in a form of deformation energy through deformation. The first preprocessing region 712 and the second preprocessing region 713 may perform a plurality of damping attenuation movements, and then dissipate greater vibration impact energy through the damping attenuation movements, thereby preventing the vibration component 700 (especially the elastic element 710) from being damaged when the vibration component 700 vibrates, and improving the reliability of the vibration component 700.

In some embodiments, the first displacement provided by the first preprocessing region 712 for the enhanced region 711 along the vibration direction of the enhanced region 711 may be the same or different from the second displacement provided by the second preprocessing region 713 for the enhanced region 711 along the vibration direction of the enhanced region 711. In some embodiments, a ratio of the first displacement to the second displacement may be in a range of 1:50-50:1. In some embodiments, the ratio of the first displacement to the second displacement may be in a range of 1:10-10:1. In some embodiments, the ratio of the first displacement to the second displacement may be in a range of 1:2-5:1. In some embodiments, the second displacement provided by the second preprocessing region 713 for the enhanced region 711 along the vibration direction of the enhanced region 711 (or the first displacement provided by the first preprocessing region 712 for the enhanced region 711 along the vibration direction of the enhanced region 711) may be in a range of 1 um-50 um. In some embodiments, the second displacement provided by the second preprocessing region 713 (or the first displacement provided by the first preprocessing region 712) for the enhanced region 711 along the vibration direction of the enhanced region 711 may be in a range of 2 um-45 um. In some embodiments, the second displacement provided by the second preprocessing region 713 (or the first displacement provided by the first preprocessing region 712) for the enhanced region 711 along the vibration direction of the enhanced region 711 may be in a range of 3 um-40 um. In some embodiments, the second displacement provided by the second preprocessing region 713 (or the first displacement provided by the first preprocessing region 712) for the enhanced region 711 along the vibration direction of the enhanced region 711 may be in a range of 3.5 um-35 um. In some embodiments, the second displacement provided by the second preprocessing region 713 (or the first displacement provided by the first preprocessing region 712) for the enhanced region 711 along the vibration direction of the enhanced region 711 may be in a range of 4 um-30 um.

In some embodiments, the second preprocessing region 713 may be disposed around a periphery of the first preprocessing region 712, and the fixed region 714 may be disposed around a periphery of the second preprocessing region 713. In some embodiments, an inner peripheral side of the second preprocessing region 713 (a peripheral side close to the enhanced region 711) may encircle the peripheral side of the first preprocessing region 712 and may be mechanically connected to the peripheral side of the first preprocessing region 712, and an outer peripheral side of the second preprocessing region 713 (a peripheral side away from the enhanced region 711) may encircle a peripheral side of the fixed region 714 and may be mechanically connected to the peripheral side of the fixed region 714. In some embodiments, projections of the enhanced region 711, the first preprocessing region 712, the second preprocessing region 713, and the fixed region 714 along the vibration direction of the enhanced region 711 are disposed sequentially from inside to outside. In some embodiments, the projections of the elastic element 710 and the enhanced region 711 along the vibration direction of the enhanced region 711 may be a regular and/or an irregular polygon such as a circle, a rectangle, a pentagon, a hexagon, etc. The projection of the second preprocessing region 713 along the vibration direction of the enhanced region 711 may be a regular and/or irregular polygonal ring such as a circular ring, a rectangular ring, a pentagonal ring, etc. corresponding to a regular and/or an irregular polygon such as a circle, a rectangle, a pentagon, and a hexagon, etc.

Figure 7:
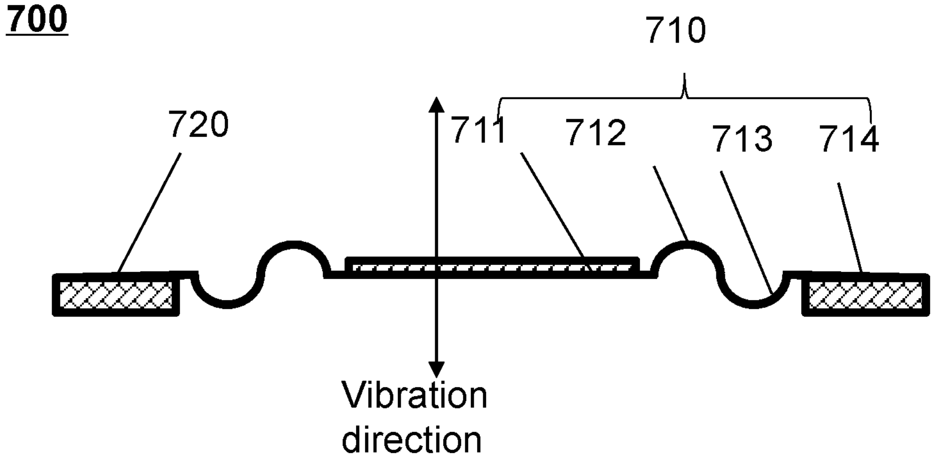
FIG. 7 is a structural diagram illustrating an exemplary vibration component according to some embodiments of the present disclosure.
Figure 8:
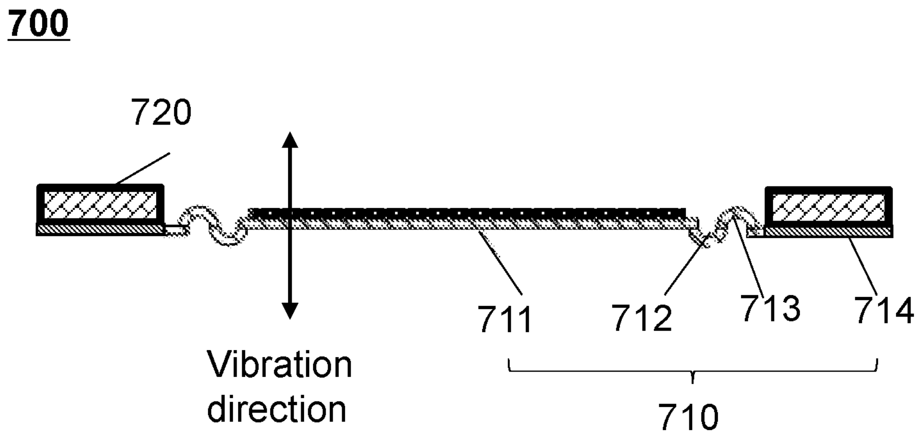
FIG. 8 is a structural diagram illustrating an exemplary vibration component according to some embodiments of the present disclosure.
Figure 9:
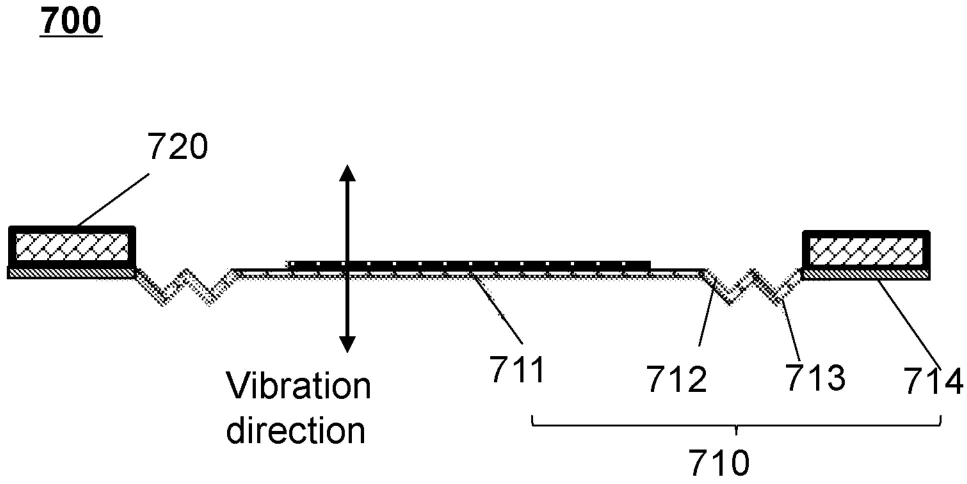
FIG. 9 is a structural diagram illustrating an exemplary vibration component according to some embodiments of the present disclosure.

In some embodiments, referring to FIGS. 7-9, the second preprocessing region 713 and the first preprocessing region 712 may be directly connected, that is, a distance between the second preprocessing region 713 and the first preprocessing region 712 may be zero. The second preprocessing region 713 may be directly connected with the first preprocessing region 712. It may also be understood that the peripheral side (the peripheral side close to the first preprocessing region 712) of the second preprocessing region 713 may be directly connected with the peripheral side (the peripheral side close to the second preprocessing region 713) of the first preprocessing region 712.

Figure 10:
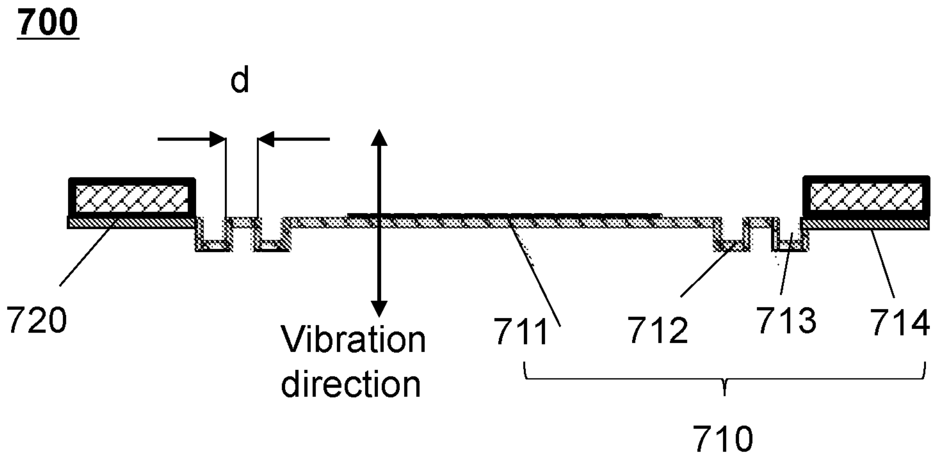
FIG. 10 is a structural diagram illustrating an exemplary vibration component according to some embodiments of the present disclosure.
Figure 11:
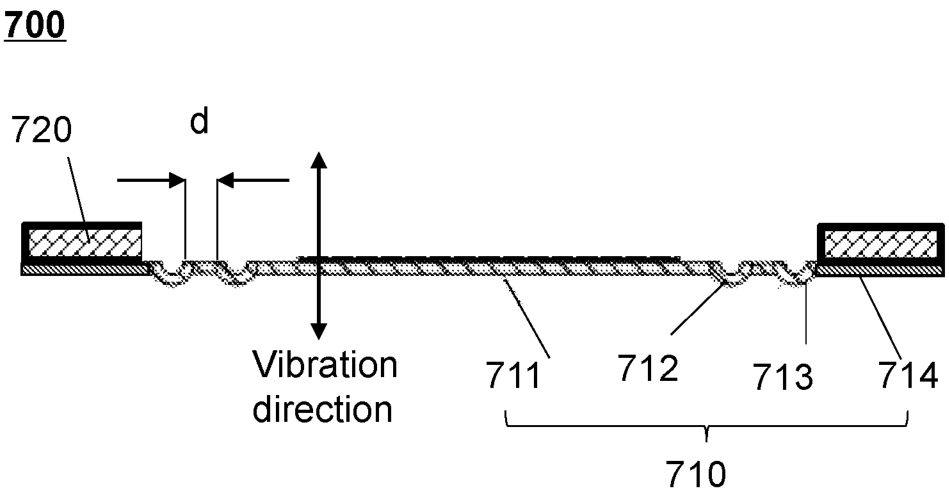
FIG. 11 is a structural diagram illustrating an exemplary vibration component according to some embodiments of the present disclosure.

In some embodiments, referring to FIGS. 10-11, the second preprocessing region 713 and the first preprocessing region 712 may also be disposed at intervals, that is, there may be a specific distance d between the second preprocessing region 713 and the first preprocessing region 712. The specific distance d may be a distance between the peripheral side (the peripheral side close to the first preprocessing region 712) of the second preprocessing region 713 and the peripheral side (the peripheral side close to the second preprocessing region 713) of the first preprocessing region 712. In some embodiments, the peripheral side of the second preprocessing region 713 and the peripheral side of the first preprocessing region 712 may be connected by a non-preprocessing region. In some embodiments, a width of a projection of the non-preprocessing region on a plane perpendicular to the vibration direction of the enhanced region 711 may be d.

In some embodiments, on the one hand, the direct connection or the spaced disposal between the second preprocessing region 713 and the first preprocessing region 712 may adjust a deformability of the second preprocessing region 713 and the first preprocessing region 712, thereby adjusting the second displacement provided by the second preprocessing region 713 for the enhanced region 711 along the vibration direction of the enhanced region 711, and adjusting the first displacement provided by the first preprocessing region 712 for the enhanced region 711 along the vibration direction of the enhanced region 711. On the other hand, the direct connection between the second preprocessing region 713 and the first preprocessing region 712 or the spaced disposal may also adjust a stiffness of the elastic element 710. In some embodiments, the stiffness of the elastic element 710 when the second preprocessing region 713 is directly connected with the first preprocessing region 712 may be smaller than the stiffness of the elastic element 710 when the second preprocessing region 713 and the first preprocessing region 712 are spaced apart. In some embodiments, by disposing the connection manner between the second preprocessing region 713 and the first preprocessing region 712, the resonant frequency and the sensitivity of the vibration component 700 may be adjusted.

In some embodiments, the specific distance d between the second preprocessing region 713 and the first preprocessing region 712 may be in a range of 0 um-500 um. In some embodiments, the specific distance d between the second preprocessing region 713 and the first preprocessing region 712 may be in a range of 0 um-300 um. In some embodiments, the specific distance d between the second preprocessing region 713 and the first preprocessing region 712 may be in a range of 0 um-100 um.

In some embodiments, referring to FIGS. 12-15, the second preprocessing region 713 may include a second bending ring 7131. The second bending ring 7131 may have a second bending direction. The second bending direction may be a direction that is perpendicular to the plane connecting the two ends of the second bending ring 7131 and points toward the bending portion.

In some embodiments, a shape of the cross-section of the second bending ring 7131 on a cross-section parallel to the vibration direction of the enhanced region 711 may include but be not limited to, one or more of a circular arc shape (e.g., FIG. 8), an elliptical arc shape, a broken line shape, a pointed tooth shape (e.g., FIG. 9), and a square tooth shape (e.g., FIG. 10). In some embodiments, along the vibration direction of the enhanced region 711, the second bending rings 7131 with different shapes of the cross-sections may have different deformability, so that the second displacements provided by the second preprocessing region 713 for the enhanced region 711 along the vibration direction of the enhanced region 711 may be different. In some embodiments, according to a requirement of the first displacement provided by the first preprocessing region 713 for the enhanced region 711 along the vibration direction of the enhanced region 711, the shape of the cross-section of the first bending ring 7131 may be set accordingly. The embodiments of the present disclosure make no limitation on that.

Figure 12:
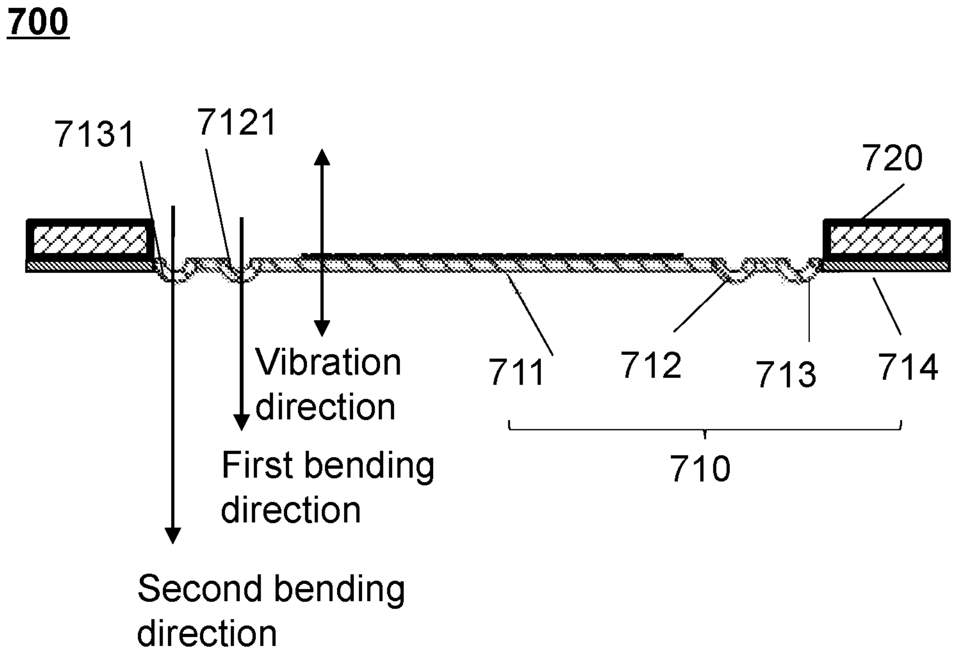
FIG. 12 is a structural diagram illustrating an exemplary vibration component according to some embodiments of the present disclosure.

In some embodiments, referring to FIG. 12, the first bending direction of the first bending ring 7121 and the second bending direction of the second bending ring 7131 may be the same. In some embodiments, referring to FIGS. 13-15, the first bending direction of the first bending ring 7121 may be different from the second bending direction of the second bending ring 7131. In some embodiments, the first bending ring and the second bending ring may be smooth curves (a curvature of a smooth curve is not equal to 0, and a first derivative of the smooth curve is continuous). When the first bending direction of the first bending ring 7121 is the same as the second bending direction of the second bending ring, a center of curvature corresponding to a point on the first bending ring 7121 and a center of curvature corresponding to a point on the second bending ring 7131 may be located on the same side of the elastic element along the vibration direction of the enhanced region 711. In some embodiments, the first bending ring and the second bending ring may be smooth curves (a curvature of a smooth curve is not equal to 0, and a first derivative of the smooth curve is continuous). When the first bending direction of the first bending ring 7121 is different from the second bending direction of the second bending ring 7131, the center of curvature corresponding to a point on the first bending ring 7121 and the center of curvature corresponding to a point on the second bending ring 7131 may be respectively located on two sides of the elastic element along the vibration direction of the enhanced region 711.

Figure 13:
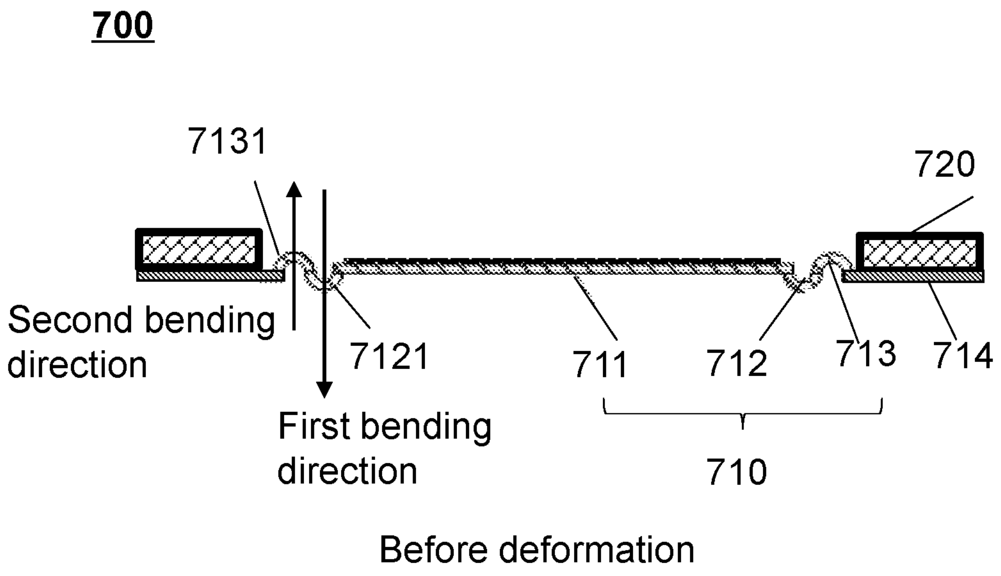
FIG. 13 is a structural diagram illustrating an exemplary vibration component according to some embodiments of the present disclosure.
Figure 13:
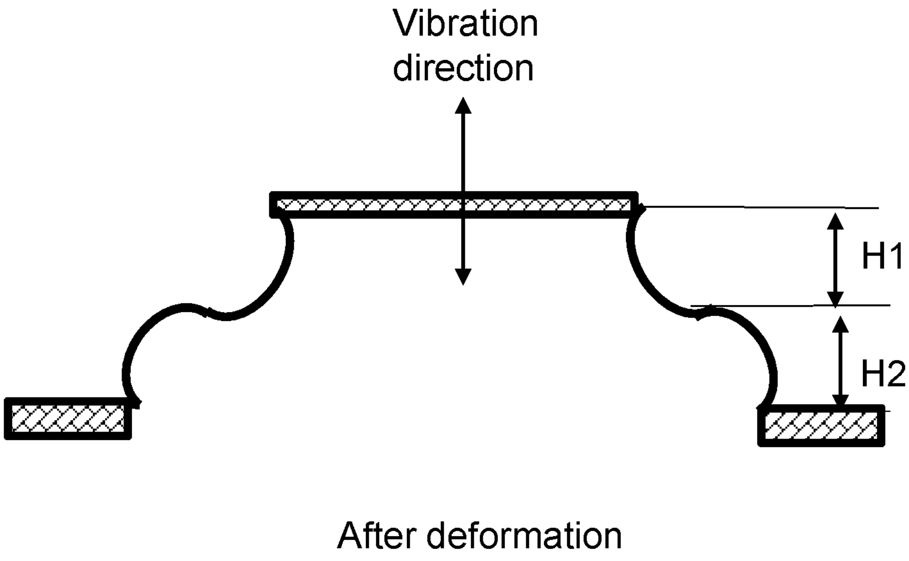

In some embodiments, referring to FIG. 13, the first bending direction of the first bending ring 7121 may be opposite to the second bending direction of the second bending ring 7131. The first bending direction of the first bending ring 7121 being opposite to the second bending direction of the second bending ring 7131 may indicate that a direction in which the bending portion of the first bending ring 7121 protrudes may be opposite to a direction in which the bending portion of the second bending ring 7131 protrudes on the same plane. In this case, the vibration displacement or the vibration amplitude of the enhanced region 711 along the vibration direction of the enhanced region 711 may be formed by a superposition of the first displacement H1 and the second displacement H2.

Figure 14A:
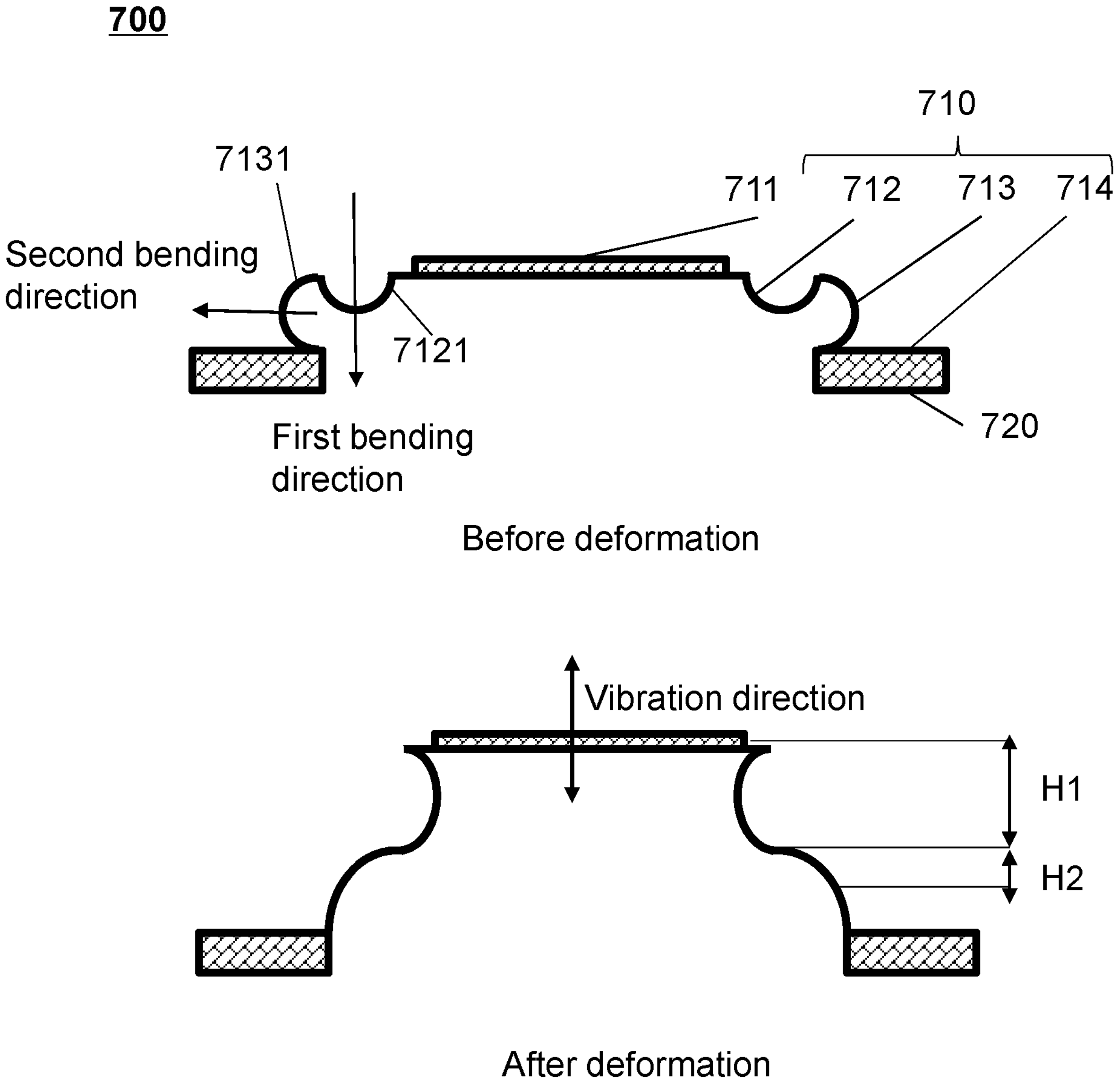
FIG. 14A is a structural diagram illustrating an exemplary vibration component according to some embodiments of the present disclosure.
Figure 14B:
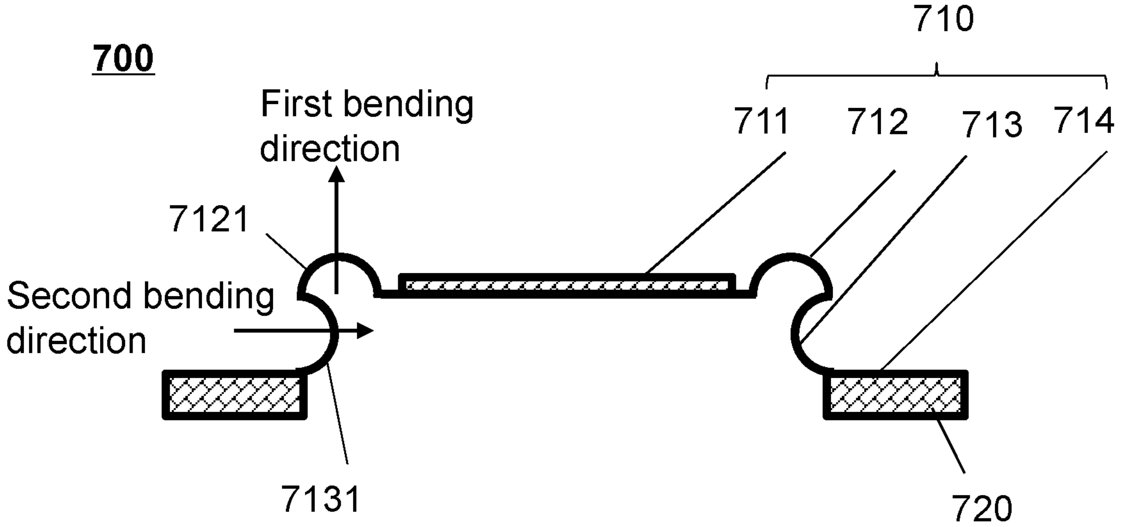
FIG. 14B is a structural diagram illustrating an exemplary vibration component according to some embodiments of the present disclosure.
Figure 14B:
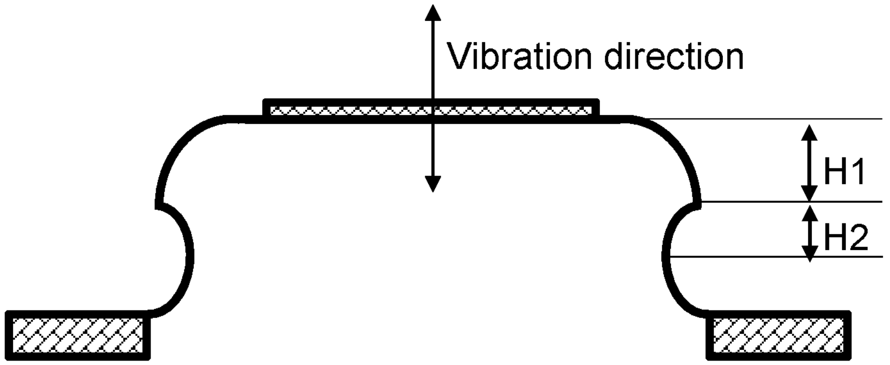
Figure 14C:
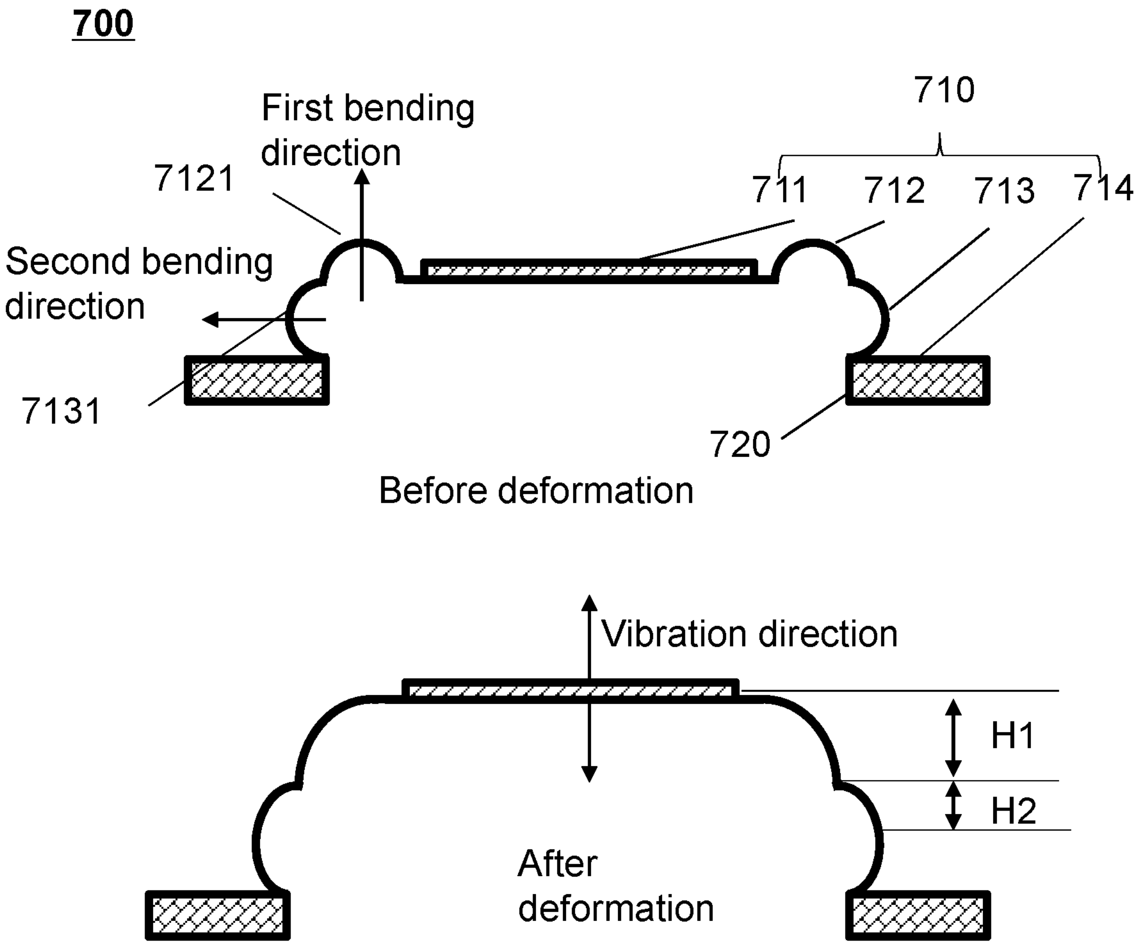
FIG. 14C is a structural diagram illustrating an exemplary vibration component according to some embodiments of the present disclosure.

In some embodiments, referring to FIGS. 14A-14C, the first bending direction of the first bending ring 7121 and the second bending direction of the second bending ring 7131 may be perpendicular to each other. In some embodiments, referring to FIG. 14A, the first bending direction of the first bending ring 7121 may be parallel to the vibration direction of the enhanced region 711, one end of the second bending ring 7131 may be connected with the first bending ring, and the other end may be away from the plane where the enhanced region 711 is located along the first bending direction. In some embodiments, the second bending direction may be perpendicular to the vibration direction of the enhanced region 711. In some embodiments, referring to FIG. 14A, the second bending direction of the second bending ring 7131 may deviate from a middle of the elastic element 710. In some embodiments, the second bending direction of the second bending ring may face toward the middle of the elastic element 710. In this case, the vibration displacement or the vibration amplitude of the enhanced region 711 along the vibration direction of the enhanced region 711 may be formed by the superposition of the first displacement H1 and the second displacement H2. In some embodiments, referring to FIG. 14B and FIG. 14C, the first bending direction of the first bending ring 7121 may be parallel to the vibration direction of the enhanced region 711, one end of the second bending ring 7131 may be connected with the first bending ring 7121, and the other end of the second bending ring 7131 may be away from the plane where the enhanced region 711 is located along a direction opposite to the first bending direction. In some embodiments, the second bending direction may be perpendicular to the vibration direction of the enhanced region 711. In some embodiments, referring to FIG. 14B, the second bending direction of the second bending ring 7131 may face toward the middle of the elastic element 710. In some embodiments, referring to FIG. 14C, the second bending direction of the second bending ring 7131 may deviate from the middle of the elastic element 710. In this case, the vibration displacement or the vibration amplitude of the enhanced region 711 along the vibration direction of the enhanced region 711 may be formed by the superposition of the first displacement H1 and the second displacement H2.

By disposing the first bending direction of the first bending ring 7121 and the second bending direction of the second bending ring 7131 to be perpendicular to each other, the second bending ring 7131 may have a greater designing dimension, so that the second bending ring 7131 may have a greater deformation along the vibration direction of the enhanced region 711, thereby increasing the second displacement provided by the second preprocessing region 1122 for the enhanced region 711 along the vibration direction of the enhanced region 711, further increasing the vibration displacement or the vibration amplitude of the enhanced region 711 along the vibration direction of the enhanced region 711, and improving the low frequency sensitivity of the vibration component 700.

Figure 15:
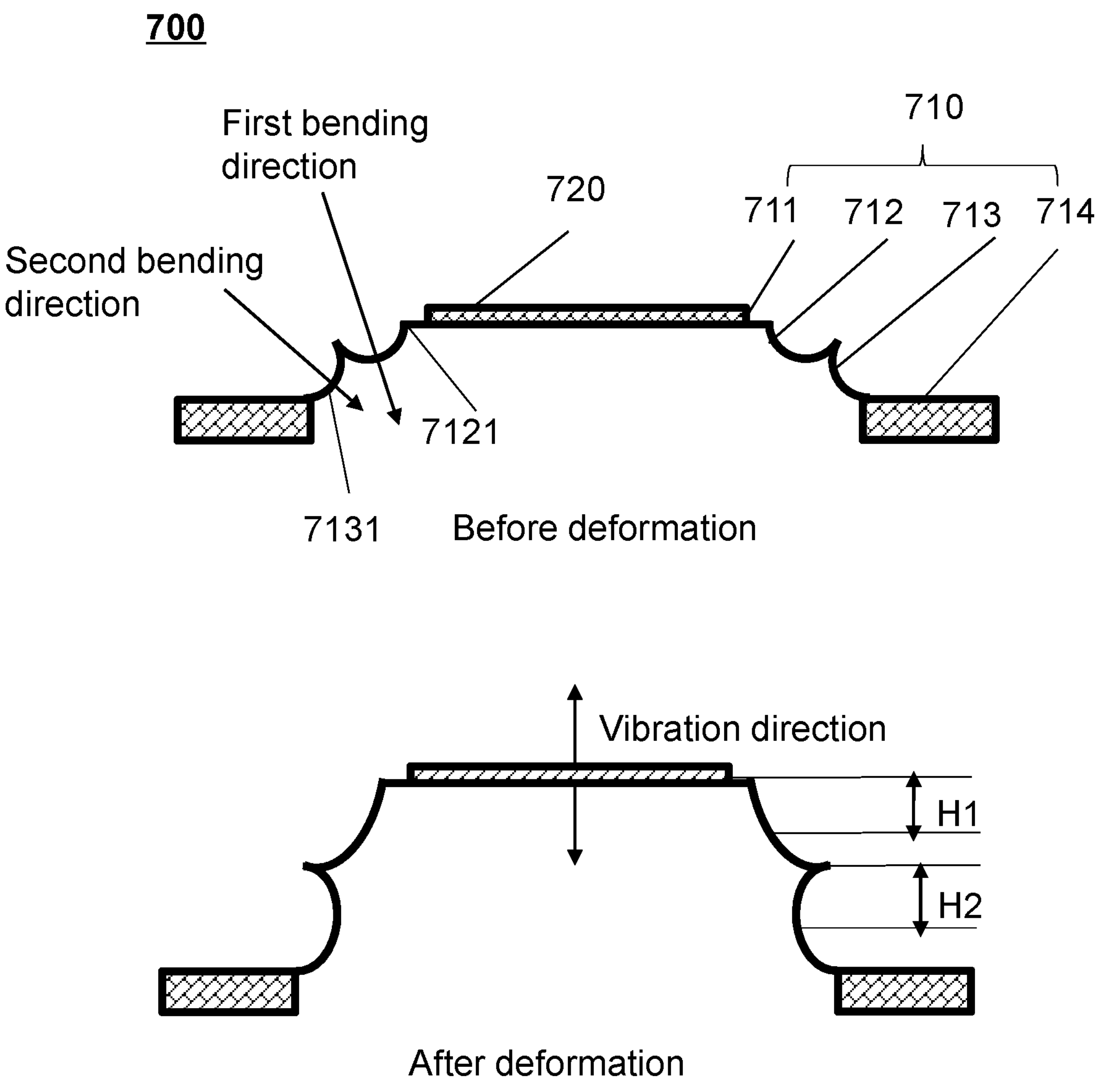
FIG. 15 is a structural diagram illustrating an exemplary vibration component according to some embodiments of the present disclosure.

In some embodiments, as shown in FIG. 15, the first bending direction of the first bending ring 7121 and the second bending direction of the second bending ring 7131 may form a second included angle. In this case, the vibration displacement or the vibration amplitude of the enhanced region 711 along the vibration direction of the enhanced region 711 may be formed by the superposition of the first displacement H1 and the second displacement H2. In some embodiments, by setting the first bending direction of the first bending ring 7121 and the second bending direction of the second bending ring 7131, the dimension of the first displacement H1 and the second displacement H2 may be adjusted, thereby adjusting the vibration displacement or the vibration amplitude of the enhanced region 711 along the vibration direction of the enhanced region 711.

In some embodiments, the second included angle formed by the first bending direction and the second bending direction may be in a range of 0°-360°. In some embodiments, the second included angle formed by the first bending direction and the second bending direction may be in a range of 210°-270°. In some embodiments, the second included angle formed by the first bending direction and the second bending direction may be in a range of 60°-120°. In some embodiments, the second included angle formed by the first bending direction and the second bending direction may be in a range of 90°-200°. In some embodiments, the second included angle formed by the first bending direction and the second bending direction may be in a range of 10°-100°.

In some embodiments, the first bending direction of the first bending ring 7121 and the second bending direction of the second bending ring 7131 may be parallel to each other. For example, as shown in FIGS. 12-13, the first bending direction of the first bending ring 7121 may be parallel to the second bending direction of the second bending ring 7131. When the first bending direction of the first bending ring 7121 is parallel to the second bending direction of the second bending ring 7131, the first bending direction of the first bending ring 7121 and the second bending direction of the second bending ring 7131 may be the same (e.g., as shown in FIG. 12) or the opposite (e.g., as shown in FIG. 13).

It should be noted that instead of being disposed strictly and accurately, the disposing of the first bending direction and the second bending direction in the present disclosure may allow a certain error in the direction described in each embodiment (e.g., an angle deviation within ±10°).

In some embodiments, the first bending direction of the first bending ring 7121 may be different from the second bending direction of the second bending ring 7131, so that the first preprocessing region 712 and the second preprocessing region 713 may have a stronger deformability along the vibration direction of the enhanced region 711, thereby increasing the vibration displacement and the vibration amplitude provided by the preprocessing regions for the enhanced region 711 along the vibration direction of the enhanced region 711.

In some embodiments, a projected area of the second bending ring 7131 on a plane perpendicular to the vibration direction of the enhanced region may be smaller than the projected area of the first bending ring 7121 on the plane perpendicular to the vibration direction of the enhanced region, so that when the second displacement of the second bending ring 7131 is increased, an increase of a total projected area of the second bending ring 7131 and the first bending ring 7121 on the plane perpendicular to the vibration direction of the enhanced region may be very small. When the total projected area of the second bending ring 7131 and the first bending ring 7121 on the plane perpendicular to the vibration direction is relatively small, the enhanced region 711 may have a relatively great projected area on the plane perpendicular to the vibration direction of the enhanced region 711, so that the enhanced region 711 may push relatively much air to vibrate during the vibration of the vibration component 700, thereby improving the low frequency performance of the vibration component 700.

In some embodiments, a ratio of the projected area of the second bending ring 7131 along the vibration direction of the enhanced region 711 to the projected area of the first bending ring 7121 along the vibration direction of the enhanced region 711 may be in a range of 1:60-1:2. In some embodiments, the ratio of the projected area of the second bending ring 7131 along the vibration direction of the enhanced region 711 to the projected area of the first bending ring 7121 along the vibration direction of the enhanced region 711 may be in a range of 1:50-2:5. In some embodiments, the ratio of the projected area of the second bending ring 7131 along the vibration direction of the enhanced region 711 to the projected area of the first bending ring 7121 along the vibration direction of the enhanced region 711 may be in a range of 1:20-1:5.

In some embodiments, a dimension (e.g., a length, a height) of the second bending ring 7131 along the second bending direction may be set to meet the second displacement provided by the second preprocessing region 713 for the enhanced region 711 along the vibration direction of the enhanced region 711.

In some embodiments, a height of a projected shape of the second bending ring 7131 on a projection plane parallel to the vibration direction of the enhanced region 711 may be in a range of 50 um-250 um. In some embodiments, the height of the projected shape of the second bending ring 7131 on the projection plane parallel to the vibration direction of the enhanced region 711 may be in a range of 60 um-240 um. In some embodiments, the height of the projected shape of the second bending ring 7131 on the projection plane parallel to the vibration direction of the enhanced region 711 may be in a range of 70 um-220 um. In some embodiments, the height of the projected shape of the second bending ring 7131 on the projection plane parallel to the vibration direction of the enhanced region 711 may be in a range of 80 um-200 um. In some embodiments, the height of the projected shape of the second bending ring 7131 on the projection plane parallel to the vibration direction of the enhanced region 711 may be in a range of 90 um-180 um.

In some embodiments, in the projected shape of the second bending ring 7131 on the projection plane parallel to the vibration direction of the enhanced region 711, a dimension along a radial direction of the projected shape or a radial direction of a circumcircle of the projected shape may be defined as a length of the second bending ring 7131. In some embodiments, a length of the projected shape of the second bending ring 7131 on the projection plane parallel to the vibration direction of the enhanced region 711 may be in a range of 400 um-800 um. In some embodiments, the length of the projected shape of the second bending ring 7131 on the projection plane parallel to the vibration direction of the enhanced region 711 may be in a range of 450 um-750 um. In some embodiments, the length of the projected shape of the second bending ring 7131 on the projection plane parallel to the vibration direction of the enhanced region 711 may be in a range of 500 um-700 um. In some embodiments, the length of the projected shape of the second bending ring 7131 on the projection plane parallel to the vibration direction of the enhanced region 711 may be in a range of 520 um-680 um. In some embodiments, the length of the projected shape of the second bending ring 7131 on the projection plane parallel to the vibration direction of the enhanced region 711 may be in a range of 530 um-660 um. In some embodiments, the length of the projected shape of the second bending ring 7131 on the projection plane parallel to the vibration direction of the enhanced region 711 may be in a range of 550 um-620 um.

In some embodiments, a ratio of the height to the length of the projected shape of the second bending ring 7131 on the projection plane parallel to the vibration direction of the enhanced region 711 may be in a range of 1:16-5:8. In some embodiments, the ratio of the height to the length of the projected shape of the second bending ring 7131 on the projection plane parallel to the vibration direction of the enhanced region 711 may be in a range of 1:8-1:2. In some embodiments, the ratio of the height to the length of the projected shape of the second bending ring 7131 on the projection plane parallel to the vibration direction of the enhanced region 711 may be in a range of 1:4-3:8.

In some embodiments, referring to FIG. 14A, when the second bending direction of the second bending ring 7131 is away from the middle of the elastic element 710, the height of the second bending ring 7131 along the second bending direction may be smaller than the length of the second bending ring 7131 along the direction perpendicular to the second bending direction. The height of the second bending ring 7131 along the second bending direction being smaller than the length of the second bending ring 7131 along the direction perpendicular to the second bending direction may enable the enhanced region 711 to have a greater projected area on the plane perpendicular to the vibration direction of the enhanced region 711. The enhanced region 711 may push more air to vibrate during the vibration process, thereby improving a low frequency performance of the vibration component 700.

In some embodiments, referring to FIGS. 7-15, the ratio of the length of the second bending ring 7131 along the direction perpendicular to the second bending direction to the length of the enhanced region 711 along the direction perpendicular to the vibration direction of the enhanced region 711 may be in a range of 1:20-8:25. In some embodiments, the ratio of the length of the second bending ring 7131 along the direction perpendicular to the second bending direction to the length of the enhanced region 711 along the direction perpendicular to the vibration direction of the enhanced region 711 may be in a range of 1:15-4:15. In some embodiments, the ratio of the length of the second bending ring 7131 along the direction perpendicular to the second bending direction to the length of the enhanced region 711 along the direction perpendicular to the vibration direction of the enhanced region 711 may be in a range of 1:10-1:5. In some embodiments, the ratio of the length of the second bending ring 7131 along the direction perpendicular to the second bending direction to the length of the enhanced region 711 along the direction perpendicular to the vibration direction of the enhanced region 711 may be in a range of 1:8-1:6.

Figure 16:
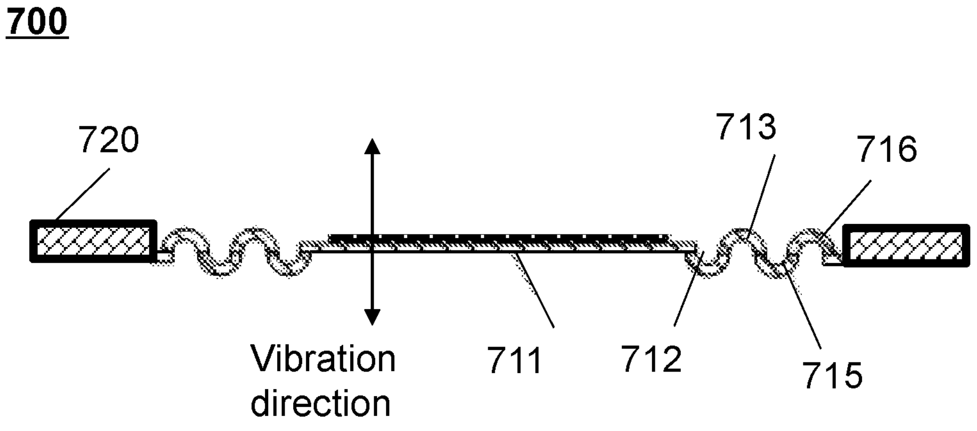
FIG. 16 is a structural diagram illustrating an exemplary vibration component according to some embodiments of the present disclosure.
Figure 17:
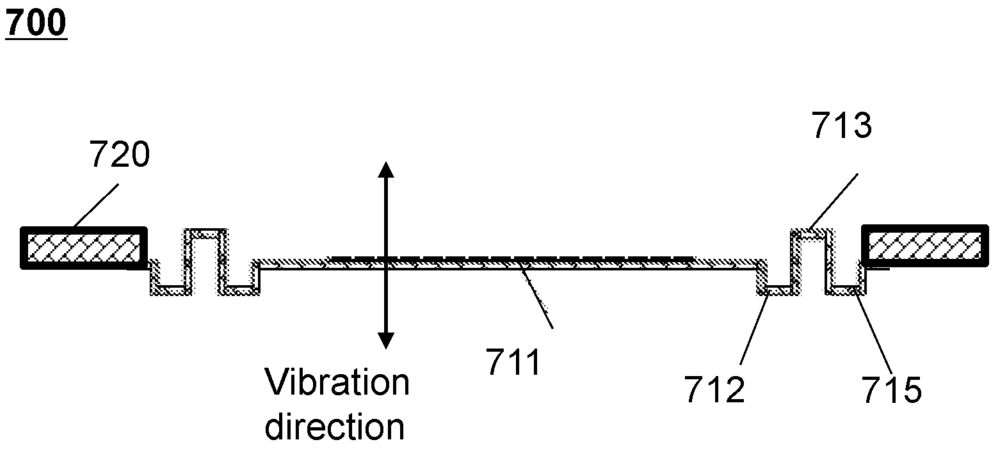
FIG. 17 is a structural diagram illustrating an exemplary vibration component according to some embodiments of the present disclosure.
Figure 18:
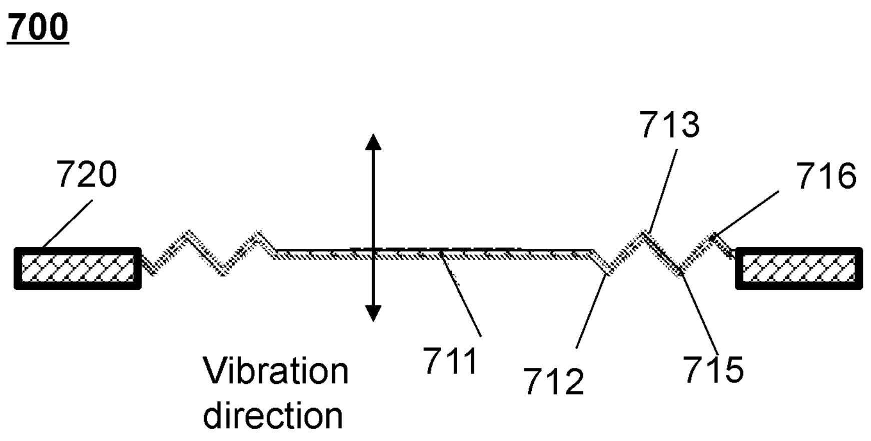
FIG. 18 is a structural diagram illustrating an exemplary vibration component according to some embodiments of the present disclosure.

It should be noted that, in addition to the first preprocessing region 712 and the second preprocessing region 713, the elastic element 710 of the vibration component 700 may also include more preprocessing regions, for example, a third preprocessing region 715, a fourth preprocessing region 716, etc. shown in FIGS. 16-18. The third preprocessing region 715 encircles the peripheral side of the second preprocessing region 713 and is mechanically connected to the peripheral side of the second preprocessing region 713, and the fourth preprocessing region 716 encircles a peripheral side of the third preprocessing region 715 and is mechanically connected to the peripheral side of the third preprocessing region 715. A number of the preprocessing regions included in the elastic element 710 may be set according to requirements for the vibration component 700 (e.g., the displacement provided by the preprocessing region for the enhanced region 711 along the vibration direction of the enhanced region 711), the embodiments of the present disclosure make no limitation on that.

FIG. 19-FIG. 28 are structural diagrams illustrating exemplary vibration components according to some embodiments of the present disclosure.

In some embodiments, referring to FIGS. 19-28, one or more elements of a vibration component 1900 (e.g., an elastic element 1910, an enhanced region 1911, a first preprocessing region 1912, a fixed region 1913, a first bending ring 19121, etc.) may be the same as or similar to the one or more elements of the vibration component 200 shown in FIG. 2-FIG. 16. That is, the vibration component 1900 may include the enhanced region 1911, the first preprocessing region 1912, and the fixed region 1913. A difference between the vibration component 200 and the vibration component 1900 may be the supporting element 1920 of the vibration component 1900.

Figure 19:
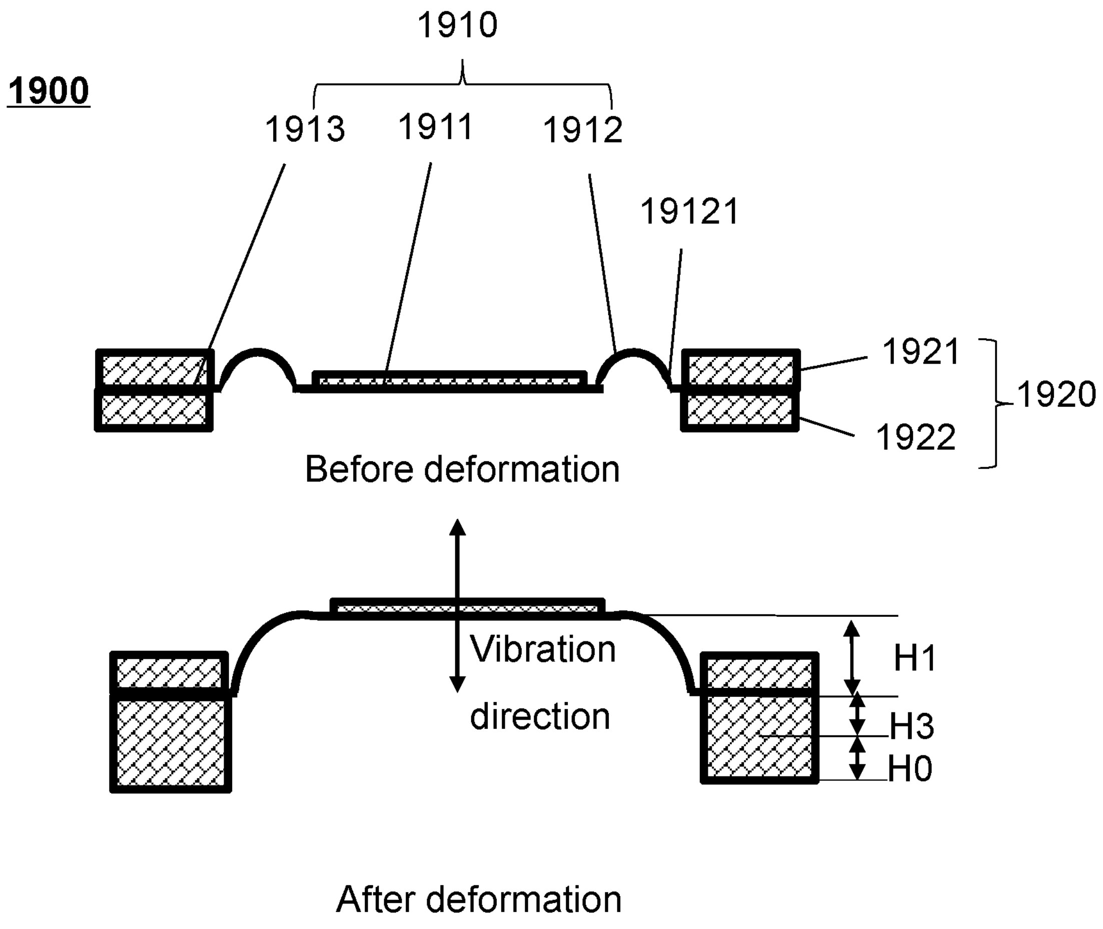
FIG. 19 is a structural diagram illustrating an exemplary vibration component according to some embodiments of the present disclosure.

In some embodiments, referring to FIG. 19, the fixed region 1913 of the elastic element 1910 of the vibration component 1900 may be disposed at a periphery of the first preprocessing region 1912 and connected with a peripheral side of the first preprocessing region 1912. The supporting element 1920 may be disposed on any surface of the fixed region 1913 along a vibration direction of the enhanced region 1911, and may be connected with the first preprocessing region 1912 through the fixed region 1913.

In some embodiments, the supporting element 1920 may include a clamping portion 1921 and a deformation portion 1922. In some embodiments, the clamping portion 1921 may be disposed opposite to the deformation portion 1922, and the fixed region 1913 may be clamped between the clamping portion 1921 and the deformation portion 1922 of the supporting element 1920. In some embodiments, the deformation portion 1922 of the supporting element 1920 may provide the enhanced region 1911 with a third displacement along the vibration direction of the enhanced region 1911 through deformation. The third displacement may be the displacement contributed by the supporting element 1920 to the enhanced region 1911 along the vibration direction of the enhanced region 1911 in the vibration process. In some embodiments, as shown in FIG. 19, an initial height of the deformation portion 1922 of the supporting element 1920 along the vibration direction of the enhanced region 1911 (the height of the deformation portion 1922 when the deformation portion 1922 is not deformed) may be H0. When the deformation portion 1922 responds to a vibration signal of the vibration component 1900 to vibrate, the deformation portion 1922 may be deformed along the vibration direction of the enhanced region 1911, so that an increase of a height of the deformation portion 1922 (that is, the deformation quantity of the deformation portion 1922) along the vibration direction of the enhanced region 1911 may be H3. The increase H3 of the height of the deformation portion 1922 along the vibration direction of the enhanced region 1911 may be the third displacement provided by the deformation portion 1922 for the enhanced region 1911 along the vibration direction of the enhanced region 1911.

In some embodiments, the third displacement H3 provided by the deformation portion 1922 of the supporting element 1920 for the enhanced region 1911 along the vibration direction of the enhanced region 1911 may be in a range of 1 um-50 um. In some embodiments, the third displacement H3 provided by the deformation portion 1922 of the supporting element 1920 for the enhanced region 1911 along the vibration direction of the enhanced region 1911 may be in a range of 2 um-45 um. In some embodiments, the third displacement H3 provided by the deformation portion 1922 of the supporting element 1920 for the enhanced region 1911 along the vibration direction of the enhanced region 1911 may be in a range of 3 um-40 um. In some embodiments, the third displacement H3 provided by the deformation portion 1922 of the supporting element 1920 for the enhanced region 1911 along the vibration direction of the enhanced region 1911 may be in a range of 3.5 um-35 um. In some embodiments, the third displacement H3 provided by the deformation portion 1922 of the supporting element 1920 for the enhanced region 1911 along the vibration direction of the enhanced region 1911 may be in a range of 4 um-30 um.

In some embodiments, by disposing the deformation portion 1922, the third displacement H3 provided by the supporting element 1920 for the enhanced region 1911 along the vibration direction of the enhanced region 1911 may be increased, so as to increase a vibration displacement or a vibration amplitude of the enhanced region 1911 along the vibration direction of the enhanced region 1911, thereby pushing more air to vibrate, and improving a low frequency performance of the vibration component 1900. At the same time, when the vibration component 1900 vibrates, the first preprocessing region 1912 and the supporting element 1920 may respectively store vibration impact energy inside the first preprocessing region 1912 and the supporting element 1920 in a form of deformation energy through deformation. The first preprocessing region 1912 and the supporting element 1920 may perform a plurality of damping attenuation movements, so as to dissipate the great vibration impact energy through the damping attenuation movements, thereby avoiding a damage to the vibration component 1900 (especially the elastic element 1910) during the vibration of the vibration component 1900, and improving a reliability of the vibration component 1900.

In some embodiments, the supporting element 1920 may not include the clamping portion 1921, and the fixed region 1913 of the elastic element 1910 may be directly connected (e.g., glued, etc.) with the deformation portion 1922.

In some embodiments, a ratio of the first displacement H1 provided by the first preprocessing region 1912 for the enhanced region 1911 along the vibration direction of the enhanced region 1911 to the third displacement H3 provided by the deformation portion 1922 for the enhanced region 1911 along the vibration direction of the enhanced region 1911 may be in a range of 1:50-50:1. In some embodiments, the ratio of the first displacement H1 to the third displacement H3 may be in a range of 1:10-10:1. In some embodiments, the ratio of the first displacement H1 to the third displacement H3 may be in a range of 3:10-3:1. In some embodiments, the ratio of the first displacement H1 to the third displacement H3 may be in a range of 1:1-10:1. In some embodiments, the ratio of the first displacement H1 to the third displacement H3 may be in a range of 1:1-5:1. In some embodiments, the ratio of the first displacement H1 to the third displacement H3 may be in a range of 1:1-3:1. In some embodiments, the ratio of the first displacement H1 to the third displacement H3 may be in a range of 1:1-2:1.

In some embodiments, the third displacement H3 provided by the supporting element 1920 for the enhanced region 1911 along the vibration direction of the enhanced region 1911 may be positively correlated with an elongation at break of the supporting element 1920 along the vibration direction of the enhanced region 1911. In some embodiments, the greater the elongation at break of the supporting element 1920 along the vibration direction of the enhanced region 1911 is, the greater the third displacement H3 provided by the supporting element 1920 for the enhanced region 1911 along the vibration direction of the enhanced region 1911 is. In some embodiments, the elongation at break of the supporting element 1920 along the vibration direction of the enhanced region 1911 may be in a range of 5%-800%. In some embodiments, the elongation at break of the supporting element 1920 along the vibration direction of the enhanced region 1911 may be in a range of 10%-600%. In some embodiments, the elongation at break of the supporting element 1920 along the vibration direction of the enhanced region 1911 may be in a range of 50%-400%.

In some embodiments, the third displacement H3 provided by the supporting element 1920 for the enhanced region 1911 along the vibration direction of the enhanced region 1911 may be negatively correlated with a hardness of the supporting element 1920. In some embodiments, the greater the hardness of the supporting element 1920 is, the smaller the third displacement H3 provided by the supporting element 1920 to the enhanced region 1911 along the vibration direction of the enhanced region 1911 is. In some embodiments, the supporting element 1920 may have a hardness of smaller than 90 degrees Shore A. In some embodiments, the supporting element 1920 may have a hardness of smaller than 80 degrees Shore A. In some embodiments, the supporting element 1920 may have a hardness of smaller than 60 degrees Shore A. In some embodiments, the supporting element 1920 may have a hardness of smaller than 30 degrees Shore A.

In some embodiments, the third displacement H3 provided by the supporting element 1920 for the enhanced region 1911 along the vibration direction of the enhanced region 1911 may be negatively correlated with a tensile strength of the supporting element 1920. In some embodiments, the greater the tensile strength of the supporting element 1920 is, the smaller the third displacement H3 provided by the supporting element 1920 for the enhanced region 1911 along the vibration direction of the enhanced region 1911 is. In some embodiments, the tensile strength of the supporting element 1920 may be in a range of 0.5 MPa and 100 MPa. In some embodiments, the tensile strength of the supporting element 1920 may be in a range of 1 MPa-50 MPa. In some embodiments, the tensile strength of the supporting element 1920 may be in a range of 0.5 MPa-10 MPa.

In some embodiments, in order to increase the third displacement H3 provided by the supporting element 1920 for the enhanced region 1911 along the vibration direction of the enhanced region 1911, the structure of the supporting element 1920 (especially the deformation portion 1922) may be disposed so that cross-sections of the supporting element 1920 perpendicular to the vibration direction of the enhanced region 1911 may have different cross-sectional areas along the vibration direction of the enhanced region 1911. For more descriptions, please refer to the relevant descriptions in FIGS. 20-26.

In some embodiments, when the cross-sections of the supporting element 1920 perpendicular to the vibration direction of the enhanced region 1911 have different cross-sectional areas along the vibration direction of the enhanced region 1911, the third displacement H3 provided by the supporting element 1920 for the enhanced region 1911 along the vibration direction of the enhanced region 1911 may be in a range of 1 um-100 um. In some embodiments, when the cross-sections of the supporting element 1920 perpendicular to the vibration direction of the enhanced region 1911 have different cross-sectional areas along the vibration direction of the enhanced region 1911, the third displacement H3 provided by the supporting element 1920 for the enhanced region 1911 along the vibration direction of the enhanced region 1911 may be in a range of 2 um-90 um. In some embodiments, when the cross-sections of the supporting element 1920 perpendicular to the vibration direction of the enhanced region 1911 have different cross-sectional areas along the vibration direction of the enhanced region 1911, the third displacement H3 provided by the supporting element 1920 for the enhanced region 1911 along the vibration direction of the enhanced region 1911 may be in a range of 3 um-80 um. In some embodiments, when the cross-sections of the supporting element 1920 perpendicular to the vibration direction of the enhanced region 1911 have different cross-sectional areas along the vibration direction of the enhanced region 1911, the third displacement H3 provided by the supporting element 1920 for the enhanced region 1911 along the vibration direction of the enhanced region 1911 may be in a range of 4 um-70 um. In some embodiments, when the cross-sections of the supporting element 1920 perpendicular to the vibration direction of the enhanced region 1911 have different cross-sectional areas along the vibration direction of the enhanced region 1911, the third displacement H3 provided by the supporting element 1920 for the enhanced region 1911 along the vibration direction of the enhanced region 1911 may be in a range of Sum-50 um.

In some embodiments, when the cross-sections of the supporting element 1920 perpendicular to the vibration direction of the enhanced region 1911 have different cross-sectional areas along the vibration direction of the enhanced region 1911, a ratio of the first displacement H1 provided by the first preprocessing region 1912 for the enhanced region 1911 along the vibration direction of the enhanced region 1911 to the third displacement H3 provided by the deformation portion 1922 for the enhanced region 1911 along the vibration direction of the enhanced region 1911 may be in a range of 1:100-50:1. In some embodiments, the ratio of the first displacement H1 to the third displacement H3 may be in a range of 1:50-50:1. In some embodiments, the ratio of the first displacement H1 to the third displacement H3 may be in a range of 1:10-10:1. In some embodiments, the ratio of the first displacement H1 to the third displacement H3 may be in a range of 1:10-1:1. In some embodiments, the ratio of the first displacement H1 to the third displacement H3 may be in a range of 1:1-5:1. In some embodiments, the ratio of the first displacement H1 to the third displacement H3 may be in a range of 1:2-2:1.

Figure 20:
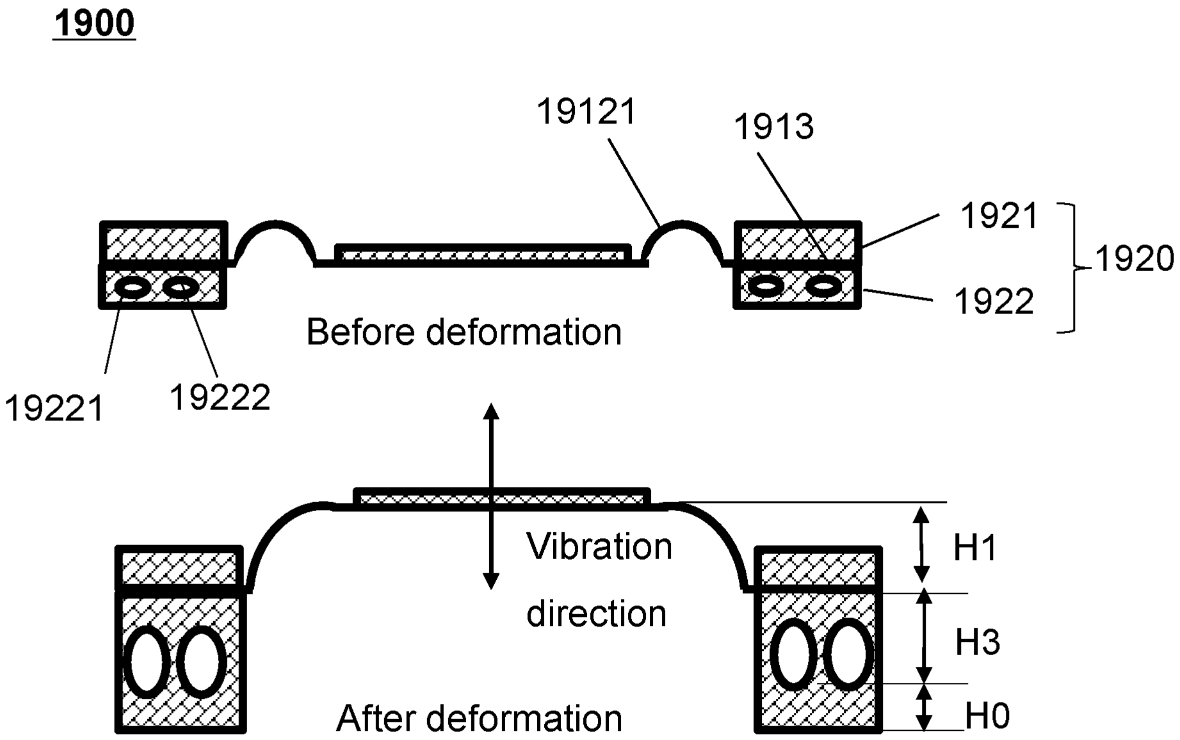
FIG. 20 is a structural diagram illustrating an exemplary vibration component according to some embodiments of the present disclosure.
Figure 21:
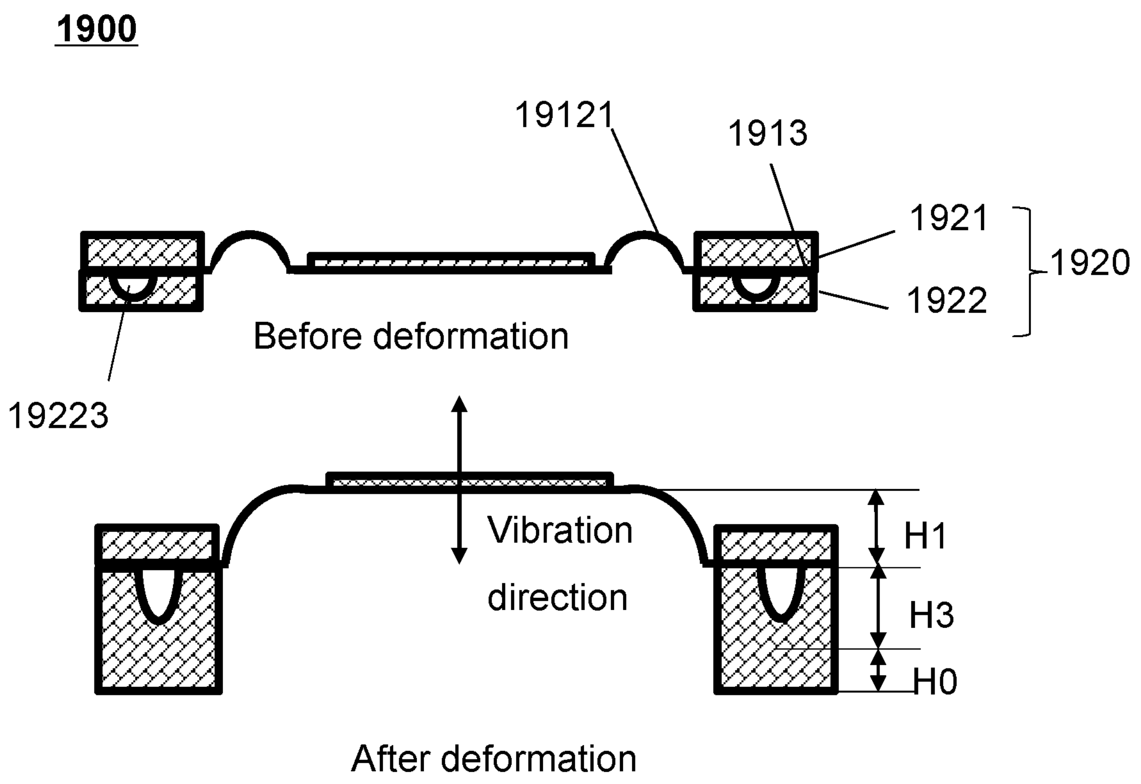
FIG. 21 is a structural diagram illustrating an exemplary vibration component according to some embodiments of the present disclosure.
Figure 22:
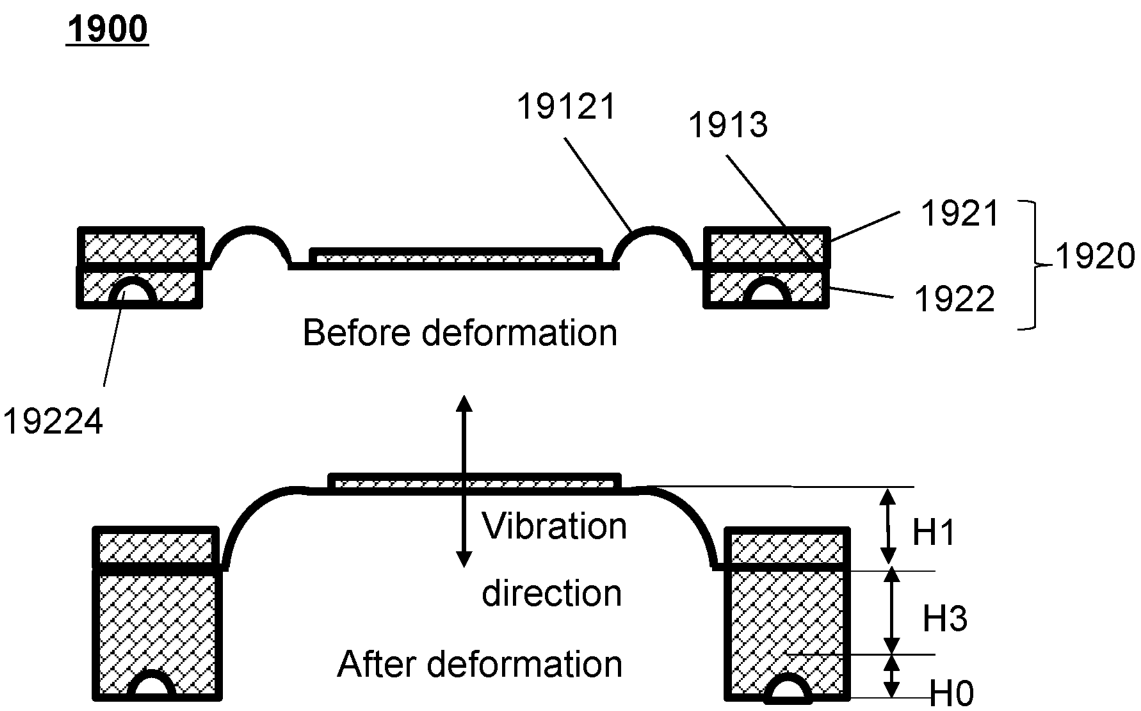
FIG. 22 is a structural diagram illustrating an exemplary vibration component according to some embodiments of the present disclosure.
Figure 23:
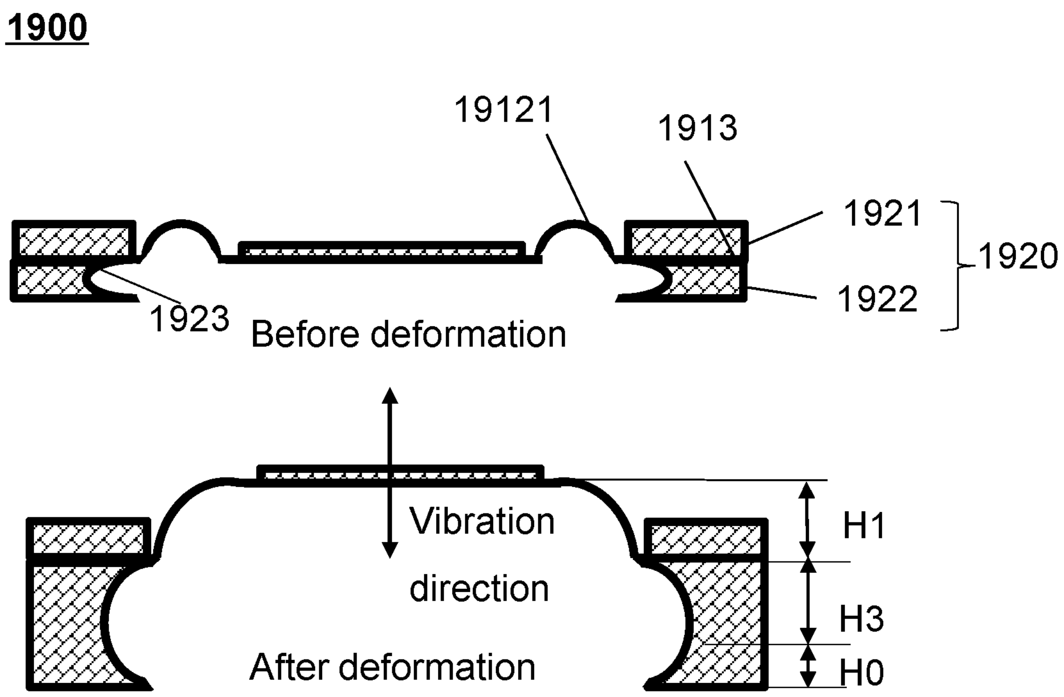
FIG. 23 is a structural diagram illustrating an exemplary vibration component according to some embodiments of the present disclosure.
Figure 24:
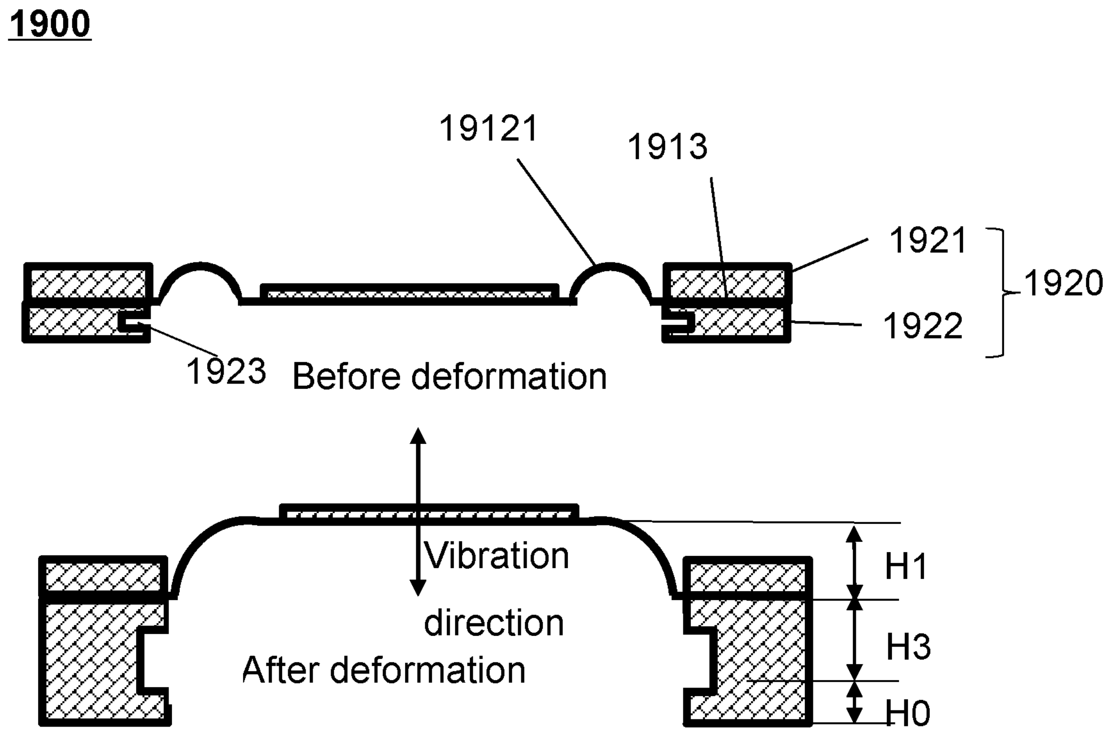
FIG. 24 is a structural diagram illustrating an exemplary vibration component according to some embodiments of the present disclosure.
Figure 25:
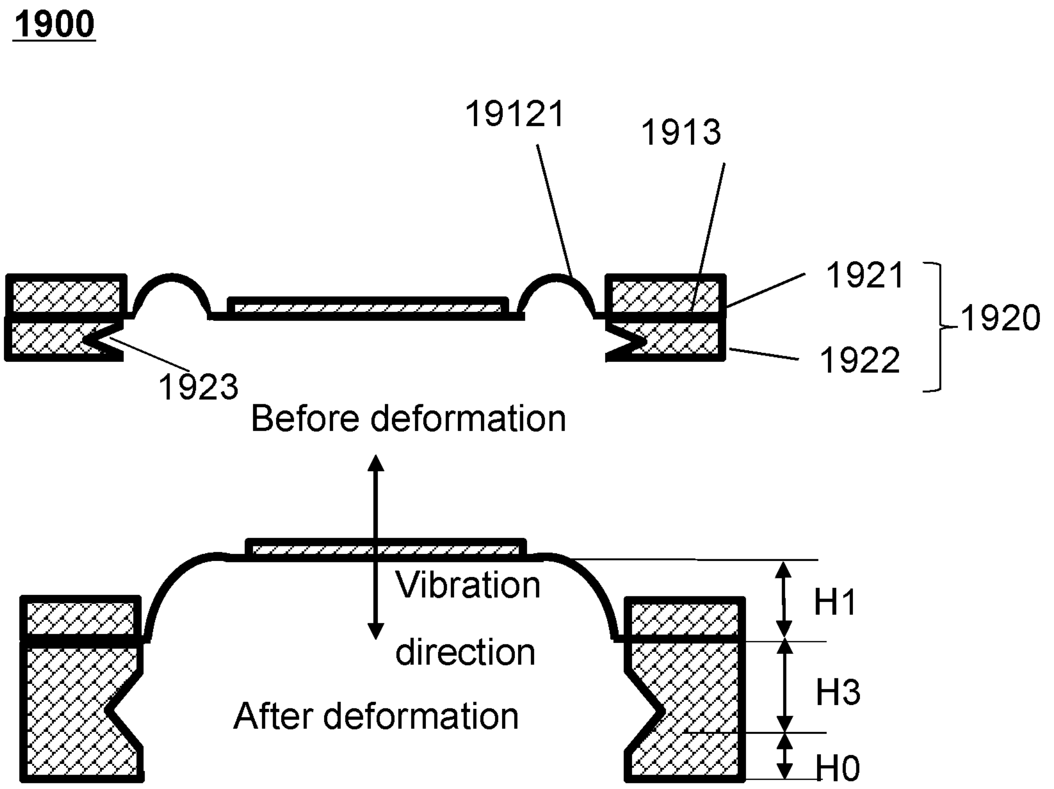
FIG. 25 is a structural diagram illustrating an exemplary vibration component according to some embodiments of the present disclosure.
Figure 26:
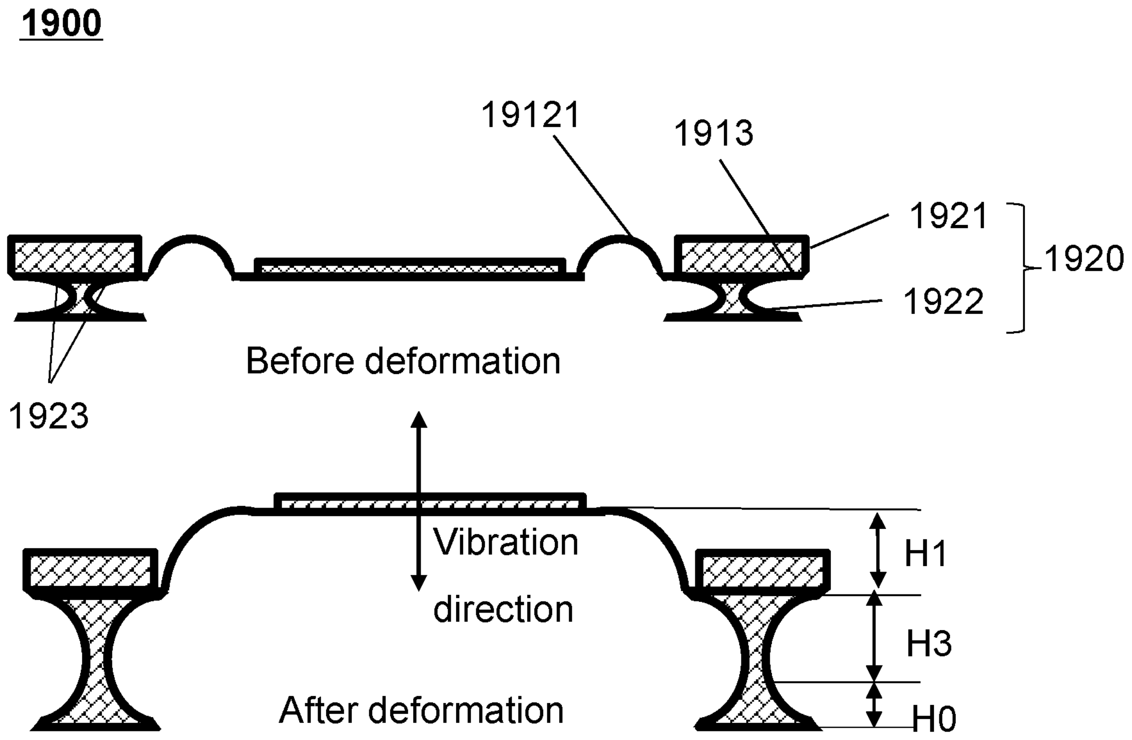
FIG. 26 is a structural diagram illustrating an exemplary vibration component according to some embodiments of the present disclosure.

In some embodiments, as shown in FIGS. 20-22, the supporting element 1920 may be a hole structure. In some embodiments, referring to FIG. 20, the supporting element 1920 may include a first hole 19221 and a second hole 19222. The first hole 19221 and the second hole 19222 may be located in the middle of the supporting element 1920. Shapes of the cross-sections of the first hole 19221 and the second hole 19222 parallel to the vibration direction of the enhanced region 1911 may be ellipses. In some embodiments, referring to FIG. 21, the supporting element 1920 may include a third hole 19223. The third hole 19223 may be located inside the supporting element 1920 near the fixed region 1913. A shape of the cross-section of the third hole 19223 parallel to the vibration direction of the enhanced region 1911 may be an arc shape. In some embodiments, referring to FIG. 22, the supporting element 1920 may include a fourth hole 19224. The fourth hole 19224 may be located inside the supporting element 1920 away from the fixed region 1913. A shape of the cross-section of the fourth hole 19224 parallel to the vibration direction of the enhanced region 1911 may be an arc shape.

In some embodiments, by disposing the supporting element 1920 as a hole structure, the deformability of the supporting element 1920 along the vibration direction of the enhanced region 1911 may be improved, thereby increasing the third displacement H3 provided by the supporting element 1920 for the enhanced region 1911 along the vibration direction of the enhanced region 1911.

It should be noted that a number of holes in the supporting element 1920, positions of the holes, dimensions of the holes, shapes of the cross-sections of the holes parallel to the vibration direction of the enhanced region 1911, etc., may be determined according to requirements for the supporting element 1920 (e.g., the third displacement H3).

In some embodiments, referring to FIGS. 23-26, an inner side and/or an outer side of the supporting element 1920 may have one or more depressions 1923. In some embodiments, referring to FIG. 23, the depression 1923 of the supporting element 1920 may be located inside the supporting element 1920, and a shape of the cross-section of the depression 1923 along the vibration direction of the enhanced region 1911 may be an arc shape. The inner side of the supporting element 1920 refers to a side of the supporting element 1920 close to the enhanced region 1911. A side opposite to the inner side of the supporting element 1920 is the outer side of the supporting element 1920, and the outer side of the supporting element 1920 refers to a side of the supporting element 1920 away from the enhanced region 1911. In some embodiments, referring to FIG. 24, the depression 1923 of the supporting element 1920 may be located inside the supporting element 1920, and the shape of the cross-section of the depression 1923 along the vibration direction of the enhanced region 1911 may be a square tooth shape. In some embodiments, referring to FIG. 25, the depression 1923 of the supporting element 1920 may be located inside the supporting element 1920, and the shape of the cross-section of the depression 1923 along the vibration direction of the enhanced region 1911 may be a pointed tooth shape. In some embodiments, referring to FIG. 26, the depressions 1923 of the supporting element 1920 may be located on the inner side and the outer side of the supporting element 1920, and the shapes of the cross-sections of the depression 1923 along the vibration direction of the enhanced region 1911 may be the arc shape.

In some embodiments, by disposing the depression 1923 on a side (the inside and/or the outside) of the supporting element 1920, the deformability of the supporting element 1920 along the vibration direction of the enhanced region 1911 may be improved, thereby increasing the third displacement H3 provided by the supporting element 1920 for the enhanced region 1911 along the vibration direction of a mass element 23210.

It should be noted that, positions of the one or more depressions 1923 of the supporting element 1920, a number of the one or more depressions 1923, shapes of the cross-sections of the one or more depressions 1923 parallel to the vibration direction of the enhanced region 1911, etc. may be disposed according to requirements for the supporting element 1920 (e.g., the dimension of the displacement H3).

Figure 27:
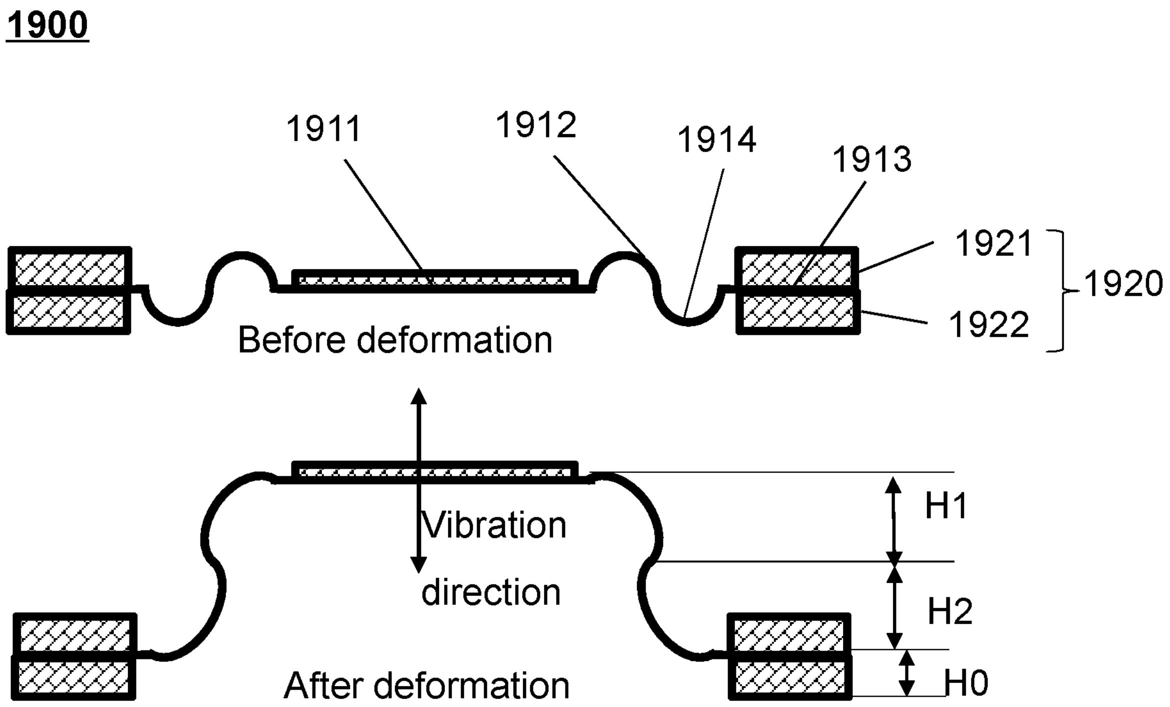
FIG. 27 is a structural diagram illustrating an exemplary vibration component according to some embodiments of the present disclosure.
Figure 28:
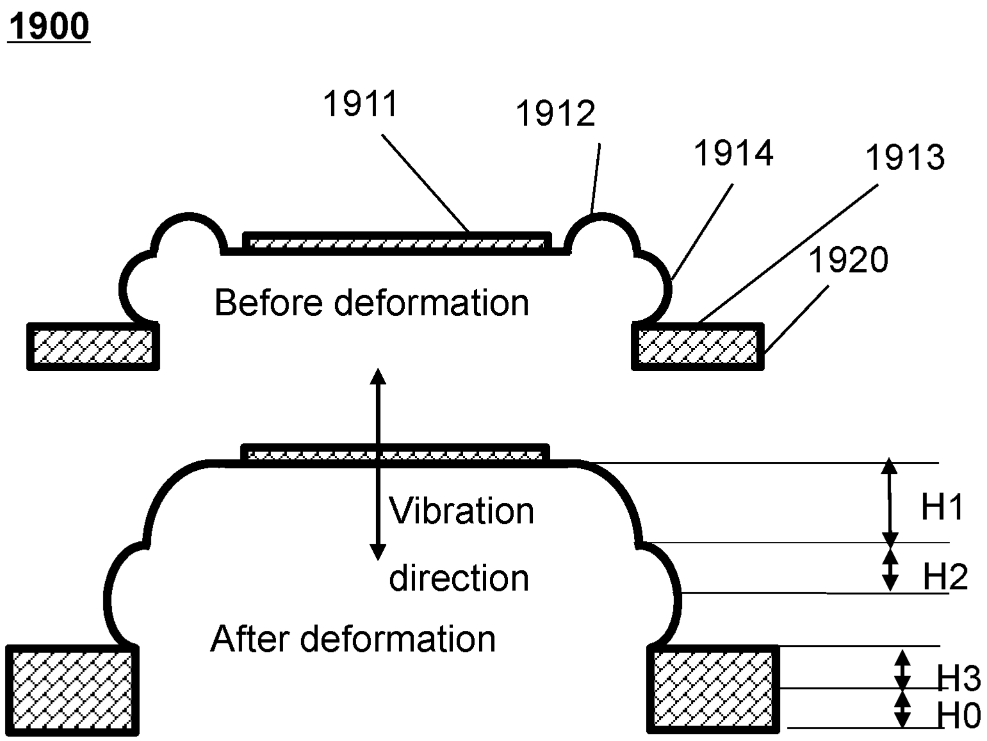
FIG. 28 is a structural diagram illustrating an exemplary vibration component according to some embodiments of the present disclosure.

In some embodiments, referring to FIG. 27 and FIG. 28, the supporting element 1920 of the vibration component 1900 may be connected with the second preprocessing region 1914. Specifically, the fixed region 1913 of the elastic element 1910 may be located at the periphery of the second preprocessing region 1914, and may encircle the peripheral side of the second preprocessing region 1914 and be mechanically connected to the peripheral side of the second preprocessing region 1914. The supporting element 1920 may be disposed on any surface of the fixed region 1913 along the vibration direction of the enhanced region 1911, and may be connected with the second preprocessing region 1914 through the fixed region 1913. The second preprocessing region 1914 may provide the enhanced region 1911 with the second displacement along the vibration direction of the enhanced region 1911.

In some embodiments, referring to FIG. 27, the supporting element 1920 may not generate deformation along the vibration direction of the enhanced region 1911, that is, the supporting element 1920 may not provide the enhanced region 1911 with the third displacement H3 along the vibration direction of the enhanced region 1911. In this case, during the vibration of the vibration component 1900, the first preprocessing region 1912 provides the enhanced region 1911 with the first displacement H1 along the vibration direction of the enhanced region 1911, the second preprocessing region 1914 of the elastic element 1910 provides the enhanced region 1911 with the second displacement H2 along the vibration direction of the enhanced region 1911. The first displacement H1 and the second displacement H2 may be superimposed to form the vibration displacement or the vibration amplitude of the enhanced region 1911 along the vibration direction of the enhanced region 1911.

In some embodiments, referring to FIG. 28, the supporting element 1920 may be deformed along the vibration direction of the enhanced region 1911, and the supporting element 1920 may provide the enhanced region 1911 with the third displacement H3 along the vibration direction of the enhanced region 1911. In this case, during the vibration of the vibration component 1900, the first preprocessing region 1912 of the elastic element 1910 provides the enhanced region 1911 with the first displacement H1 along the vibration direction of the enhanced region 1911, the second preprocessing region 1914 of the elastic element 1910 provides the enhanced region 1911 with the second displacement H2 along the vibration direction of the enhanced region 1911, and the deformation portion 1922 of the supporting element 1920 may provide the enhanced region 1911 with the third displacement H3 along the vibration direction of the enhanced region 1911. The first displacement H1, the second displacement H2 and the third displacement H3 may be superimposed to form the vibration displacement or the vibration amplitude of the enhanced region 1911 along the vibration direction of the enhanced region 1911.

In some embodiments, referring to FIGS. 27-28, the second displacement H2 provided by the second preprocessing region 1914 for the enhanced region 1911 along the vibration direction of the enhanced region 1911 may be the same as or different from the first displacement H1 provided by the first preprocessing region 1912 for the enhanced region 1911 along the vibration direction of the enhanced region 1911. In some embodiments, referring to FIGS. 27-28, the second displacement H2 provided by the second preprocessing region 1914 (or the first displacement H1 provided by the first preprocessing region 1912) for the enhanced region 1911 may be in a range of 1 um-50 um. In some embodiments, referring to FIGS. 27-28, the second displacement H2 provided by the second preprocessing region 1914 (or the first displacement H1 provided by the first preprocessing region 1912) for the enhanced region 1911 may be in a range of 2 um-45 um. In some embodiments, referring to FIGS. 27-28, the second displacement H2 provided by the second preprocessing region 1914 (or the first displacement H1 provided by the first preprocessing region 1912) for the enhanced region 1911 may be in a range of 3 um-40 um. In some embodiments, referring to FIGS. 27-28, the second displacement H2 provided by the second preprocessing region 1914 (or the first displacement H1 provided by the first preprocessing region 1912) for the enhanced region 1911 may be in a range of 3.5 um-35 um. In some embodiments, referring to FIGS. 27-28, the second displacement H2 provided by the second preprocessing region 1914 (or the first displacement H1 provided by the first preprocessing region 1912) for the enhanced region 1911 may be in a range of 4 um-30 um.

In some embodiments, referring to FIG. 28, the third displacement H3 provided by the supporting element 1920 (the deformation portion 1922) for the enhanced region 1911 along the vibration direction of the enhanced region 1911 may be in a range of 1 um-100 um. In some embodiments, referring to FIG. 28, the third displacement H3 provided by the supporting element 1920 (the deformation portion 1922) for the enhanced region 1911 along the vibration direction of the enhanced region 1911 may be in a range of 2 um-90 um. In some embodiments, referring to FIG. 28, the third displacement H3 provided by the supporting element 1920 (the deformation portion 1922) for the enhanced region 1911 along the vibration direction of the enhanced region 1911 may be in a range of 3 um-80 um. In some embodiments, referring to FIG. 28, the third displacement H3 provided by the supporting element 1920 (the deformation portion 1922) for the enhanced region 1911 along the vibration direction of the enhanced region 1911 may be in a range of 4 um-70 um. In some embodiments, referring to FIG. 28, the third displacement H3 provided by the supporting element 1920 (the deformation portion 1922) for the enhanced region 1911 along the vibration direction of the enhanced region 1911 may be in a range of 5 um-50 um.

In some embodiments, by disposing the first preprocessing region 1912, the second preprocessing region 1914, and the supporting element 1920 (the deformation portion 1922) in the vibration component 1900, the vibration displacement or the vibration amplitude (including the first displacement H1, the second displacement H2, and the third displacement H3) of the enhanced region 1911 along the vibration direction of the enhanced region 1911 may be increased. By increasing the vibration displacement or the vibration amplitude of the enhanced region 1911 in the vibration direction of the enhanced region 1911, on the one hand, when the vibration component 1900 vibrate at a relatively great amplitude, the first preprocessing region 1912, the second preprocessing region 1914, and the supporting element 1920 may respectively store a vibration impact energy inside the first preprocessing region 1912, the second preprocessing region 1914, and the supporting element 1920 in the form of deformation energy through deformations. The first preprocessing region 1912, the second preprocessing region 1914, and the supporting element 1920 may perform the plurality of damping attenuation movements, so as to dissipate the great vibration impact energy through the damping attenuation movements, thereby avoiding the damage to the vibration component 1900 (especially the elastic element 1910) when the vibration component 1900 vibrates at a great amplitude, and improving the reliability of the vibration component 1900. On the other hand, the increase of the vibration displacement or the vibration amplitude of the enhanced region 1911 in the vibration direction of the enhanced region 1911 may make the enhanced region 1911 push more air to vibrate during the vibration process, thereby improving the low frequency performance of the vibration component 1900.

Figure 29:
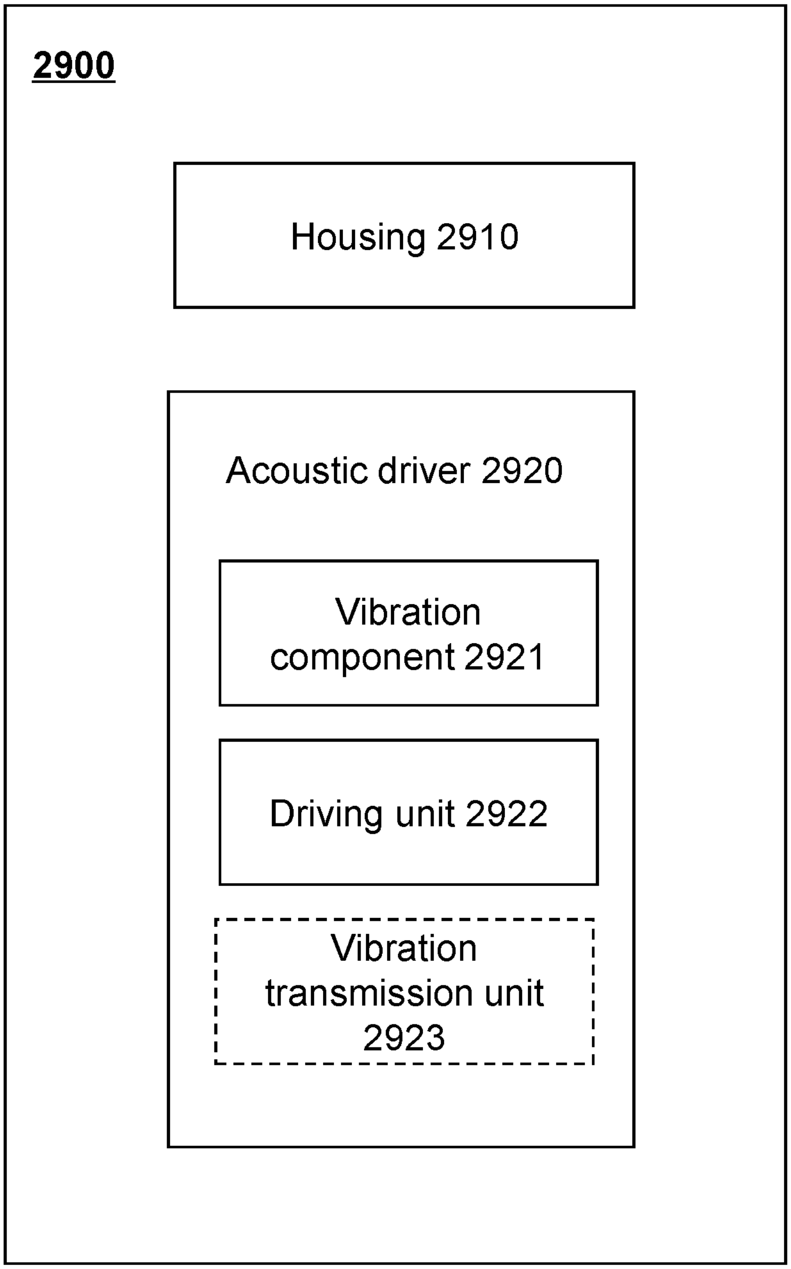
FIG. 29 is a block diagram illustrating an exemplary speaker according to some embodiments of the present disclosure.

FIG. 29 is a block diagram illustrating an exemplary speaker according to some embodiments of the present disclosure.

In some embodiments, a speaker 2900 may be used to convert a signal containing sound information into a mechanical vibration to generate a sound. For example, the speaker 2900 may generate a mechanical vibration signal based on an electrical signal. The mechanical vibration signal may be transmitted to an outside of the speaker 2900 to generate the sound. In some embodiments, the speaker 2900 may also generate the mechanical vibration based on signals other than the electrical signal, such as a mechanics signal (e.g., a pressure, a mechanical vibration), an optical signal, a thermal signal, etc. In some embodiments, the speaker 2900 may be a bone conduction speaker, an air conduction speaker, a bone air conduction integrated speaker, etc. The air conduction speaker refers to a speaker in which sound waves are conducted through air. The bone conduction speaker refers to a speaker in which sound waves are mainly conducted in solid (e.g., bones) by means of mechanical vibrations. In some embodiments, the speaker 2900 may be classified according to a working principle, and the speaker 2900 may be a moving coil speaker, a moving iron speaker, an electrostatic speaker, a piezoelectric speaker, etc.

In some embodiments, the speaker 2900 may include a housing 2910 and an acoustic driver 2920. The housing 2910 may be a regular or an irregular three-dimensional structure with an acoustic cavity (i.e., a hollow portion) inside. In some embodiments, the housing 2910 may be a hollow frame structure. In some embodiments, the hollow frame structure may include but be not limited to, a regular shape such as a rectangular frame, a circular frame, and a regular polygonal frame, as well as any irregular shape. In some embodiments, the housing 2910 may be made of a metal (e.g., a stainless steel, a copper, etc.), a plastic (e.g., PE, polypropylene PP, PVC, PS and ABS, etc.), a composite material (e.g., a metal matrix composite or a non-metal matrix composite), etc. In some embodiments, the acoustic driver 2920 may be disposed in the acoustic cavity formed by the housing 2910 or at least partially suspended in the acoustic cavity of the housing 2910.

The acoustic driver 2920 may be an acoustic device with an energy conversion function. In some embodiments, the acoustic driver 2920 may convert an electrical energy into a mechanical energy to generate the sound. In some embodiments, the acoustic driver 2920 may include a moving coil acoustic driver, a moving iron acoustic driver, an electrostatic acoustic driver, or a piezoelectric acoustic driver. In some embodiments, the moving coil acoustic driver may include a magnetic piece that generates a magnetic field and a coil disposed in the magnetic field. After the coil is energized, the coil may generate vibration in the magnetic field to convert the electrical energy into the mechanical energy, and the vibration may be further transmitted to the vibration component 2921 to generate the sound. In some embodiments, the moving iron acoustic driver may include a coil for generating an alternating magnetic field and a ferromagnetic piece disposed in the alternating magnetic field. The ferromagnetic piece vibrates under an action of the alternating magnetic field to convert the electrical energy into the mechanical energy. The vibration may be further transmitted to the vibration component 2921 to generate the sound. In some embodiments, the electrostatic acoustic driver may drive a diaphragm to vibrate through an electrostatic field disposed inside the electrostatic acoustic driver, thereby converting the electrical energy into the mechanical energy. In some embodiments, the piezoelectric acoustic driver may convert the electrical energy into the mechanical energy under an action of an electrostrictive effect through piezoelectric material disposed inside the piezoelectric acoustic driver. In some embodiments, the acoustic driver 2920 may divide a cavity formed by the housing 2910 into a first cavity (also called a front cavity) and a second cavity (also called a back cavity or a rear cavity). The sound generated by the acoustic driver 2920 may radiate towards the first cavity and/or the second cavity, and may be transmitted to the outside of the speaker 2900 through the acoustic structure (e.g., one or more holes, etc.) on the housing 2910.

In some embodiments, the acoustic driver 2920 may include a vibration component 2921 and a driving unit 2922. In some embodiments, the vibration component 2921 may vibrate relative to the housing 2910 based on a driving of the driving unit 2922. The vibration component 2921 may be any vibration component shown in FIGS. 1-28 in the embodiments of the present disclosure. For example, the vibration component 100, the vibration component 200, the vibration component 700, or the vibration component 1900. In some embodiments, the vibration component 2921 may be disposed in the acoustic cavity formed by the housing 2910 or at least partially suspended in the acoustic cavity of the housing 2910, and may be directly or indirectly connected with the housing 2910.

In some embodiments, the vibration component 2921 may include an elastic element and a supporting element. The supporting element may be connected with the housing 2910 to support the elastic element. In some embodiments, the elastic element may include an enhanced region, one or more preprocessing regions, and a fixed region. The enhanced region may be disposed in the middle of the elastic element, the one or more preprocessing regions may be disposed around a periphery of the enhanced region, and the fixed region may be disposed around a periphery of the one or more preprocessing regions. In some embodiments, the one or more preprocessing regions may provide the enhanced region with one or more displacements along the vibration direction of the enhanced region. In some embodiments, the deformability of the one or more preprocessing regions of the elastic element along the vibration direction of the enhanced region may be greater than the deformability of other regions of the elastic element (e.g., the enhanced region). During a vibration process of one or more preprocessing regions, a great deformation may be generated along the vibration direction of the enhanced region, so that the one or more preprocessing regions may provide the enhanced region with the one or more displacements along the vibration direction of the enhanced region. In some embodiments, a peripheral side of the vibration component 2911 may be connected with an inner wall of the housing 2910, thereby dividing the cavity formed by the housing 2910 into a plurality of cavities including the first cavity and the second cavity. Specifically, an upper surface of the vibration component 2911 (the surface away from the driving unit 2922) along the vibration direction of the enhanced region and the housing 2910 form the first cavity. A lower surface of the vibration component 2911 (the surface away from the vibration component 2921) along the vibration direction of the enhanced region and the housing 2910 form the second cavity.

In some embodiments, the driving unit 2922 may be located at one side of the vibration component 2921 along the vibration direction of the enhanced region. In some embodiments, the driving unit 2922 may be disposed inside the cavity formed by the housing 2910. In some embodiments, the driving unit 2922 may be connected with the vibration component 2921.

In some embodiments, the acoustic driver 2920 may further include a vibration transmission unit 2923. In some embodiments, the driving unit 2922 and the vibration transmission unit 2923 may be located at one side of the vibration component 2921 along the vibration direction of the enhanced region. The vibration component 2921 (the elastic element), the vibration transmission unit 2923, and the driving unit 2922 may be sequentially disposed from top to bottom along the vibration direction of the enhanced region. Two ends of the vibration transmission unit 2923 along the vibration direction of the enhanced region may be respectively connected with the enhanced region and the driving unit 2922.

In some embodiments, taking the air conduction speaker as an example, the drive unit 2922 may convert the electrical signal into the vibration signal, and the vibration signal may be transmitted to the vibration component 2912 through the vibration transmission unit 2923 in the form of mechanical vibration. The vibration component 2921 may generate vibration and push the air in the first cavity and/or the second cavity vibrate to generate the sound. The sound may be transmitted to the outside of the speaker 2900 through the acoustic structure (e.g., the one or more holes, etc.) on the housing 2910.

Figure 30:
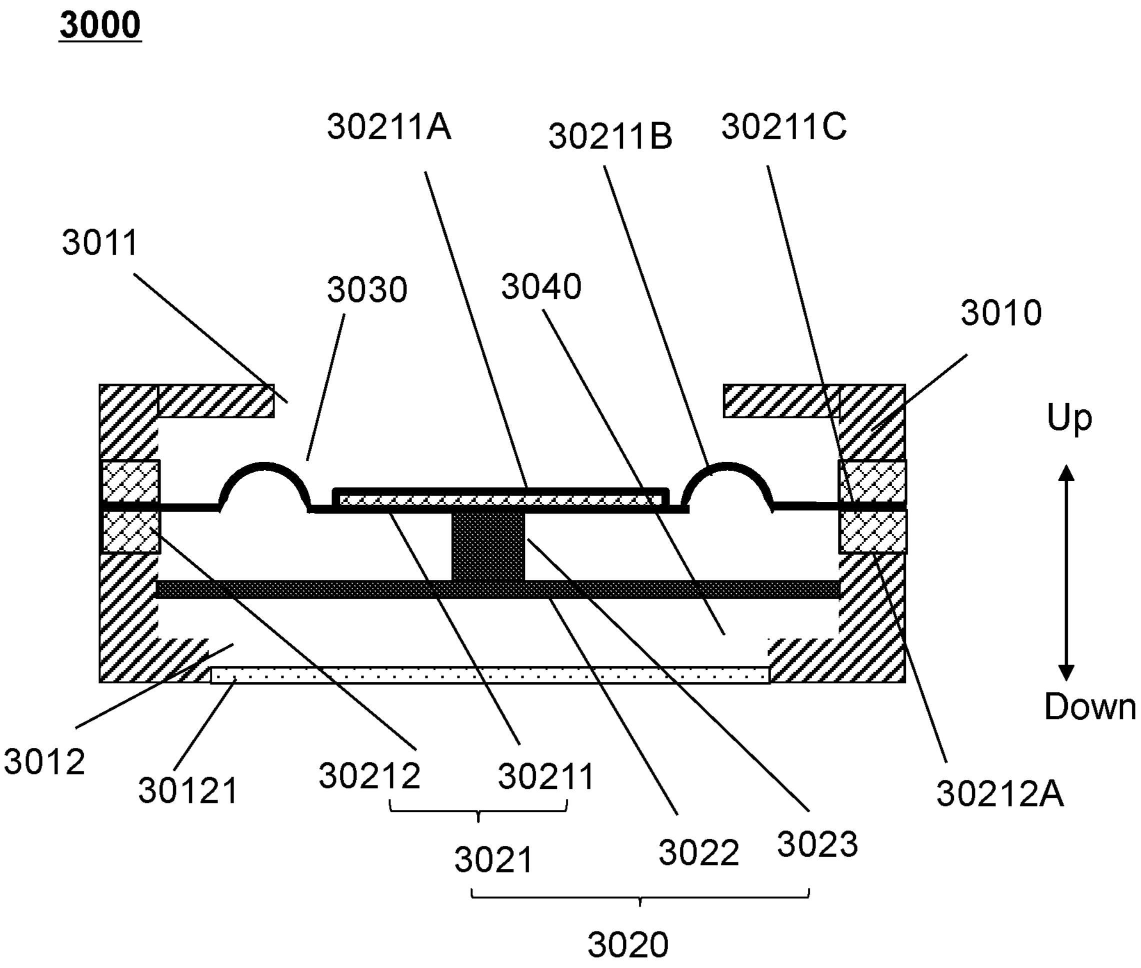
FIG. 30 is a structural diagram illustrating an exemplary speaker according to some embodiments of the present disclosure.
Figure 31:
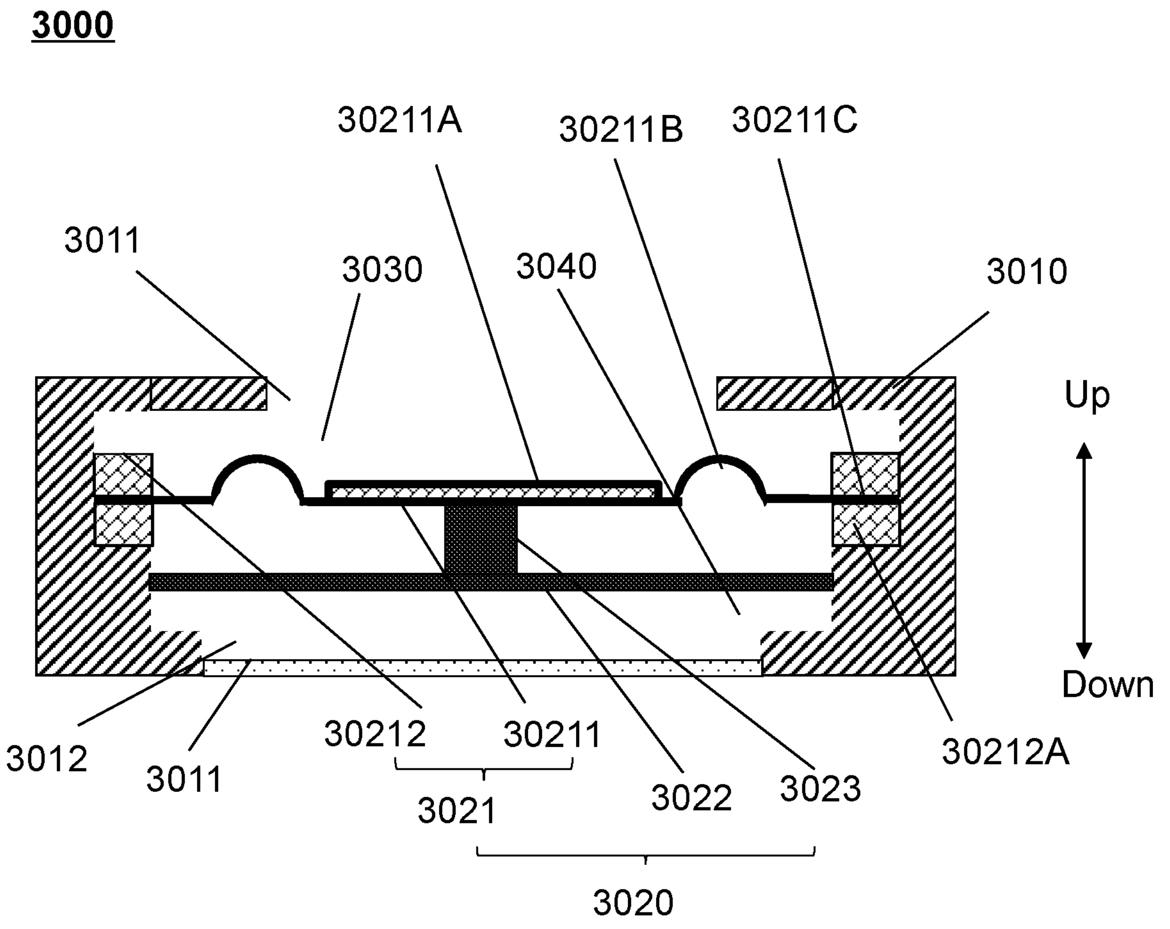
FIG. 31 is a structural diagram illustrating an exemplary speaker according to some embodiments of the present disclosure.

FIG. 30-FIG. 31 are structural diagrams illustrating exemplary speakers according to some embodiments of the present disclosure.

In some embodiments, referring to FIG. 30, a speaker 3000 may include a housing 3010 and an acoustic driver 3020. The housing 3010 may be a regular or an irregular three-dimensional structure with an acoustic cavity (i.e., a hollow portion) inside. For example, the housing may be a hollow frame structure, including but not limited to, a regular shape such as a rectangular frame, a circular frame, and a regular polygonal frame, and any irregular shape. The acoustic driver 3020 may be located in the acoustic cavity formed by the housing 3010 or may be at least partly suspended in the acoustic cavity of the housing 3010.

In some embodiments, the acoustic driver 3020 may include a vibration component 3021 and a driving unit 3022. In some embodiments, the driving unit 3022 may be connected with the vibration component 3021 to directly drive the vibration component 3021 to generate a vibration. In some embodiments, the acoustic driver 3020 may include the vibration component 3021, the driving unit 3022, and the vibration transmission unit 3023. The vibration component 3021, the vibration transmission unit 3023, and the driving unit 3022 may be disposed in sequence from top to bottom along the vibration direction of the vibration component 3021. Two ends of the vibration transmission unit 3023 along the vibration direction of the vibration component 3021 may be respectively connected with the vibration component 3021 (an enhanced region) and the driving unit 3022, so that the driving unit 3022 may drive the vibration component 3021 to vibrate through the vibration transmission unit 3023. In some embodiments, the peripheral side of the vibration component 3021 may be connected with the inner wall of the housing 3010, so as to divide the cavity formed by the housing 3010 into a plurality of cavities including the first cavity 3030 and the second cavity 3040. Specifically, an upper surface of the vibration component 3021 (the surface away from the driving unit 3022) along the vibration direction of the vibration component 3021 and the housing 3010 may form a first cavity 3030. A lower surface of the vibration component 3021 (the surface away from the vibration component 3021) along the vibration direction of the vibration component 3021 and the housing 3010 may form a second cavity 3040.

In some embodiments, one or more holes, for example, the first hole 3011 and the second hole 3012 may be opened on a side wall of the housing 3010 corresponding to the first cavity 3030 and the second cavity 3040. The first cavity 3030 may communicate with an outside of the speaker 3000 through the first hole 3011. The second cavity 3040 may communicate with the outside of the speaker 3000 through the second hole portion 3012. In some embodiments, a damping mesh (e.g., a damping mesh 30121) may be disposed on the one or more holes (e.g., the second hole 3012). In some embodiments, the damping mesh may adjust (e.g., reduce) an amplitude of the sound waves leaking from the hole, thereby improving a performance of the speaker 3000.

In some embodiments, the driving unit 3022 may be electrically connected with other components of the speaker 3000 (e.g., a signal processor) to receive an electrical signal, and convert the electrical signal into a mechanical vibration signal, and the mechanical vibration may be transmitted through the vibration transmission unit 3023 to the vibration component 3021, so that the vibration component 3021 vibrates, thereby pushing the air in the first cavity 3030 to vibrate and generate a sound. In some embodiments, the sound may be transmitted to the outside of the speaker 3000 through the one or more holes (e.g., the first hole 3011) on the housing 3010.

In some embodiments, the vibration component 3021 may include an elastic element 30211 and a supporting element 30212. Referring to FIG. 30, the supporting element 30212 may be embedded in an inner wall of the housing 3010 and connected with the housing 3010 to support the elastic element 30211. When the supporting element 30212 is embedded in the inner wall of the housing 3010, a hole matching the supporting element 30212 may be disposed on the inner wall of the housing 3010, so that the supporting element 30212 may be placed in the hole to implement an embedding of the supporting element 30212. In some embodiments, referring to FIG. 31, the supporting element 30212 may also be disposed in the cavity formed by the housing 3010, and the lower surface (the surface close to the driving unit 3022) or the peripheral side of the supporting element 30212 along the vibration direction of the vibration component 3021 may be connected with the housing 3010 to support the elastic element 30211. When the supporting element 30212 is disposed in the cavity formed by the housing 3010, the inner wall of the housing 3010 may be disposed to have a protruding structure matching the supporting element 30212, so that the supporting element 30212 may be disposed on the surface of the protruding structure along the vibration direction, so as to implement the connection of the supporting element 30212 and the housing 3010. In this case, by disposing the supporting element 30212 in the cavity formed by the housing 3010, the supporting element 30212 may be scratched and damaged during the use of the speaker 3000, thereby preventing the damage to the speaker 3000 (especially the vibration component 3021).

In some embodiments, referring to FIGS. 30-31, the elastic element 30211 may include an enhanced region 30211A, a first preprocessing region 30211B, and a fixed region 30211C. The enhanced region 30211A may be disposed in the middle of the elastic element 30211, the first preprocessing region 30211B may be disposed around a periphery of the enhanced region 30211A, and the fixed region 30211C may be disposed around a periphery of the first preprocessing region 30211B. In some embodiments, the first preprocessing region 30211B may provide the enhanced region 30211A with a first displacement along the vibration direction of the enhanced region 30211A.

In some embodiments, a volume of the first cavity 3030 may change during the vibration of the vibration component 3021 (the enhanced region 30211A). In some embodiments, the speaker 3000 may be a micro-electromechanical system (MEMS) speaker with a small size or a micro-speaker with a small size. In some embodiments, the greater the vibration displacement or the vibration amplitude of the enhanced region 30211A along the vibration direction of the enhanced region 30211A is, the greater a change of the volume of the first cavity 3030 is, that is, the stronger an air vibration in the first cavity 3030 is, and the better the low frequency performance of the speaker 3000 is (e.g., the greater the low frequency sensitivity is).

In some embodiments, the structure of the vibration component 3021 (the elastic element 30211, the supporting element 30212) may be designed to increase the vibration displacement or the vibration amplitude of the enhanced region 30211A along the vibration direction of the enhanced region 30211A. In some embodiments, referring to FIGS. 30-31, the elastic element 30211 of the vibration component 3021 may include the first preprocessing region 30211B, the first preprocessing region 30211B may include a first bending ring, and the first bending ring may have a first bend bending direction. The first bending ring may be deformed during the vibration of the elastic element 30211, making the first preprocessing region 30211B provide the enhanced region 30211A with the first displacement along the vibration direction of the enhanced region 30211A, thereby increasing the vibration amplitude or the vibration displacement of the enhanced region 30211A along the vibration direction of the enhanced region 30211A. More descriptions about the first preprocessing region 30211B and the first bending ring, please refer to descriptions elsewhere in the present disclosure.

In some embodiments, the elastic element 30211 of the vibration component 3021 may further include a second preprocessing region (not shown). The second preprocessing region may be disposed around the periphery of the first preprocessing region 30211B, and the second preprocessing region may provide the enhanced region 30211A with a second displacement along the vibration direction of the enhanced region 30211A. In some embodiments, the second preprocessing region may include a second bending ring with a second bend direction. The second bending direction may be the same as or different from the first bending direction. The second bending ring may be deformed during the vibration process of the elastic element 30211, so that the second preprocessing region provides the enhanced region 30211A with the second displacement along the vibration direction of the enhanced region 30211A, thereby increasing the vibration amplitude or the vibration displacement of the enhanced region 30211A along the vibration direction of the enhanced region 30211A. More descriptions about the second preprocessing region and the second bending ring, please refer to descriptions elsewhere in the present disclosure.

In some embodiments, the elastic element 30211 of the vibration component 3021 may further include more preprocessing regions, for example, a third preprocessing region, a fourth preprocessing region, etc. The third preprocessing region may be connected with the peripheral side of the second preprocessing region, and the fourth preprocessing region may be connected with the peripheral side of the third preprocessing region. A number of the preprocessing regions included in the elastic element 30211 may be set according to requirements (e.g., a low frequency sensitivity) for the speaker 3000 (e.g., a low frequency sensitivity), which is not particularly limited in the embodiment of the present disclosure.

In some embodiments, a structure of the supporting element 30212 may be designed to increase the vibration displacement or the vibration amplitude of the enhanced region 30211A along the vibration direction of the enhanced region 30211A. In some embodiments, the supporting element 30212 may include a deformation portion 30212A, and the deformation portion 30212A has a certain deformability along the vibration direction of the enhanced region

30211A. The deformation portion 30212A may provide the enhanced region 30211A with a third displacement along the vibration direction of the enhanced region 30211A through deformation. In some embodiments, the structure of the supporting element 30212 (e.g., a hole structure, a depression, etc.) may also be disposed so that cross-sections of the supporting element 30212 perpendicular to the vibration direction of the enhanced region 30211A may have different cross-sectional areas to increase the third displacement provided by the supporting element 30212 for the enhanced region 30211A along the vibration direction of the enhanced region 30211A, thereby in turn increasing the vibration displacement or the vibration amplitude of the enhanced region 30211A along the vibration direction of the enhanced region 30211A. More descriptions about the supporting element 30212, please refer to the descriptions elsewhere in the present disclosure.

The basic concept has been described above, obviously, for those skilled in the art, the above detailed disclosure is only an example, and does not constitute a limitation to the present disclosure. Although not explicitly stated here, those skilled in the art may make various modifications, improvements and amendments to the present disclosure. These modifications, improvements and amendments are intended to be suggested by the present disclosure, and are within the spirit and scope of the exemplary embodiments of the present disclosure.

Moreover, certain terminology has been used to describe embodiments of the present disclosure. For example, “one embodiment”, “an embodiment”, and/or “some embodiments” refer to a certain feature, structure or characteristic related to at least one embodiment of the present disclosure. Therefore, it should be emphasized and noted that two or more references to “an embodiment” or “one embodiment” or “an alternative embodiment” in different places in the present disclosure do not necessarily refer to the same embodiment. In addition, some features, structures, or characteristics in one or more embodiments of the present disclosure may be appropriately combined.

In addition, those skilled in the art may understand that various aspects of the present disclosure may be illustrated and described in several patentable categories or circumstances, including any new and useful process, machine, product or combination of substances, or any combination of them, or any new and useful improvements. Accordingly, all aspects of the present disclosure may be performed entirely by hardware, may be performed entirely by softwares (including firmware, resident softwares, microcode, etc.), or may be performed by a combination of hardware and softwares. The above hardware or softwares may be referred to as “data block”, “module”, “engine”, “unit”, “component” or “system”. In addition, aspects of the present disclosure may appear as a computer product located in one or more computer-readable media, the product including computer-readable program code.

A computer storage medium may contain a propagated data signal embodying a computer program code, for example, in a baseband or as a portion of a carrier wave. The propagated signal may have various manifestations, including an electromagnetic form, an optical form, etc., or a suitable combination. A computer storage medium may be any computer-readable medium, other than a computer-readable storage medium, that can be used to communicate, propagate, or transfer a program for use by being coupled to an instruction execution system, apparatus, or device. Program code residing on a computer storage medium may be transmitted over any suitable medium, including radio, electrical cable, fiber optic cable, RF, etc., or combinations of any of the foregoing.

The computer program codes required for the operation of each portion of the present disclosure may be written in any one or more programming languages, including object-oriented programming languages such as Java, Scala, Smalltalk, Eiffel, JADE, Emerald, C++, C#, VB.NET, Python etc., conventional procedural programming languages such as C language, Visual Basic, Fortran 2003, Perl, COBOL 2002, PHP, ABAP, moving coil programming languages such as Python, Ruby and Groovy, or other programming languages, etc. The program code may run entirely on the user's computer, or as a stand-alone software package, or run partially on the user's computer and partially on a remote computer, or entirely on the remote computer or server. In the latter case, the remote computer may be connected with the user computer through any form of network, such as a local area network (LAN) or a wide area network (WAN), or to an external computer (e.g., through the Internet), or in a cloud computing environment, or as a service use software as a service (SaaS).

In addition, unless explicitly stated in the claims, the order of the processing elements and the sequences described in the present disclosure, the use of numbers and letters, or the use of other designations are not used to limit the order of the flow and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, rather, on the contrary, are intended to cover modifications and equivalent disposals that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of simplifying the disclosure and facilitate the understanding of one or more of the various embodiments. However, this disclosure does not mean that the disclosed object requires more features than the features mentioned in the claims. Rather, claimed subject matter may lie in smaller than all features of a single foregoing disclosed embodiment.

In some embodiments, numbers describing the quantity of components and attributes are used. It should be understood that such numbers used in the description of the embodiments use the modifiers “about”, “approximately” or “substantially” in some examples for modification. Unless otherwise stated, the “about”, “approximately” or “substantially” indicates that the stated figure allows for a variation of ±20%. Accordingly, in some embodiments, the numerical parameters used in the present disclosure and claims are approximations that can vary depending upon the desired characteristics of individual embodiments. In some embodiments, the numerical parameters should take into account the specified significant digits and adopt the general digit reservation method. Although the numerical ranges and parameters used in some embodiments of the present disclosure to confirm the breadth of the scope are approximate values, in specific embodiments, such numerical values are set as precisely as practicable.

The entire contents of each patent, patent application, patent application publication, and other material, such as article, book, specification, publication, document, etc., cited in the present disclosure are hereby incorporated by reference into the present disclosure. Application history documents that are inconsistent with or conflict with the content of the present disclosure are excluded, as are documents (currently or hereafter appended to the present disclosure) that limit the broadest scope of the claims of the present disclosure. It should be noted that if there is any inconsistency or conflict between the descriptions, definitions, and/or terms used in the attached materials of the present disclosure and the contents of the present disclosure, the descriptions, definitions and/or terms used in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A vibration component, comprising:

an elastic element, the elastic element including an enhanced region, a first preprocessing region, and a fixed region, the enhanced region being disposed in the middle of the elastic element, the first preprocessing region being disposed around a periphery of the enhanced region, and the fixed region being disposed around a periphery of the first preprocessing region; and a supporting element connected with the fixed region, wherein when the elastic element vibrates, the first preprocessing region provides the enhanced region with a first displacement along a vibration direction of the enhanced region, wherein the supporting element provides the enhanced region with a second displacement along the vibration direction of the enhanced region.

2. The vibration component of claim 1, wherein the elastic element further includes a second preprocessing region disposed between the first preprocessing region and the fixed region, the second preprocessing region provides the enhanced region with a third displacement along the vibration direction of the enhanced region.

3. The vibration component of claim 2, wherein the first preprocessing region includes a first bending ring with a first bending direction; and the second preprocessing region includes a second bending ring with a second bending direction.

4. The vibration assembly of claim 3, wherein a shape of a cross-section of the first bending ring and/or the second bending ring parallel to the vibration direction of the enhanced region includes one or more of an arc shape, an elliptical arc shape, a broken line shape, a pointed tooth shape, or a square tooth shape.

5. The vibration component of claim 3, wherein the first bending direction is opposite to or perpendicular to the second bending direction.

6. The vibration component of claim 3, wherein a projected area of the second bending ring on a plane perpendicular to the vibration direction of the enhanced region is smaller than a projected area of the first bending ring on the plane perpendicular to the vibration direction of the enhanced region.

7. The vibration component of claim 1, wherein an elongation at break of the supporting element along the vibration direction of the enhanced region is in a range of 10%-600%.

8. The vibration component of claim 1, wherein the supporting element has a hardness of smaller than 80 Shore A.

9. The vibration component of claim 1, wherein a tensile strength of the supporting element is in a range of 0.5 MPa-100 MPa.

10. The vibration component of claim 1, wherein cross-sections of the supporting element perpendicular to the vibration direction of the enhanced region have different cross-sectional areas along the vibration direction of the enhanced region.

11. A speaker, comprising:

a housing forming a cavity; and an acoustic driver located within the cavity, the acoustic driver including a vibration component and a driving unit, wherein the vibration component includes an elastic element and a supporting element for supporting the elastic element, the supporting element being connected with the housing; and the elastic element includes an enhanced region, a first preprocessing region, and a fixed region, the enhanced region being disposed in the middle of the elastic element, the first preprocessing region being disposed around a periphery of the enhanced region, and the fixed region being disposed around a periphery of the first preprocessing region, and the fixed region being connected with the supporting element, wherein when the elastic element vibrates, the first preprocessing region provides the enhanced region with a first displacement along a vibration direction of the enhanced region, wherein the supporting element provides the enhanced region with a second displacement along the vibration direction of the enhanced region.

12. The speaker of claim 11, wherein the elastic element further includes a second preprocessing region disposed between the first preprocessing region and the fixed region, the second preprocessing region provides the enhanced region with a third displacement along the vibration direction of the enhanced region.

13. The speaker of claim 12, wherein the first preprocessing region includes a first bending ring with a first bending direction;

the second preprocessing region includes a second bending ring with a second bending direction; and the first bending direction being the same as or different from the second bending direction.

14. The speaker of claim 13, wherein the first displacement provided by the first bending ring for the enhanced region is in a range of 1 um-50 um.

15. The speaker of claim 13, wherein the third displacement provided by the second bending ring for the enhanced region is in a range of 1 um-50 um.

16. The speaker of claim 13, wherein a height of a projected shape of the first bending ring on a projection plane parallel to the vibration direction of the enhanced region is in a range of 50 um-250 μm, and a length of the projected shape of the first bending ring on the projection plane parallel to the vibration direction of the enhanced region is 400 um-800 um.

17. The speaker of claim 13, wherein a height of a projected shape of the second bending ring on a projection plane parallel to the vibration direction of the enhanced region is in a range of 50 um-250 um, and a length of the projected shape of the second bending ring on the projection plane parallel to the vibration direction of the enhanced region is in a range of 400 um-800 um.

18. The speaker of claim 15, wherein the second displacement is in a range of 1 um-50 um.

* * * * *